United States Patent
Walker et al.

(10) Patent No.: US 9,631,681 B2
(45) Date of Patent: Apr. 25, 2017

(54) GEAR MECHANISM FOR MOTOR VEHICLES

(71) Applicant: FORD GLOBAL TECHNOLOGIES, LLC, Dearborn, MI (US)

(72) Inventors: Ralph S. Walker, Livonia, MI (US); Andreas Tissot, Remscheid (DE); Shawn A. Holland, Livonia, MI (US); Johann Kirchhoffer, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 386 days.

(21) Appl. No.: 13/965,409

(22) Filed: Aug. 13, 2013

(65) Prior Publication Data
US 2014/0048372 A1 Feb. 20, 2014

(30) Foreign Application Priority Data
Aug. 16, 2012 (DE) .......................... 10 2012 214590

(51) Int. Cl.
*F16D 21/06* (2006.01)
*F16D 21/00* (2006.01)
*F16D 13/64* (2006.01)

(52) U.S. Cl.
CPC ............. *F16D 21/00* (2013.01); *F16D 13/64* (2013.01); *F16D 21/06* (2013.01);
(Continued)

(58) Field of Classification Search
CPC ............... F16D 13/64; F16D 2013/642; F16D 2021/0615; F16D 13/52; F16D 13/38;
(Continued)

(56) References Cited

U.S. PATENT DOCUMENTS 2,143,040 A * 1/1939 Thelander ............... F16D 13/68
192/70.18
8,215,461 B2 * 7/2012 Holme et al. ............. 188/250 G
(Continued)

FOREIGN PATENT DOCUMENTS

DE      2111892 A1    9/1972
DE      3546454 C2    2/1987
(Continued)

OTHER PUBLICATIONS

Definition of "progressive," screenshot taken from merriam-webster.com/dictionary/progressive.*
(Continued)

*Primary Examiner* — Stacey Fluhart
(74) *Attorney, Agent, or Firm* — James Dottavio; MacMillan, Sobanski & Todd, LLC

(57) ABSTRACT

A gear mechanism for motor vehicles includes a double clutch gear mechanism with two part gear mechanisms and a double clutch which transmits torque from the engine optionally to one of the two part gear mechanisms, with a central disk connected to a drive disk, two outer pressure application plates which are also connected to the drive disk and are moveable in the axial direction relative to the central disk, and friction disks arranged between the central disk and the pressure application plates, wherein the friction disks consist of two support carrier disks arranged parallel to each other and moveably in relation to each other, between which leaf-like spring segments are provided. To eliminate vibration problems which can occur on start-up from standstill, on load-change processes and during the gear change, the leaf-like spring segments have different spring characteristic curves with which a multistage spring characteristic is achieved.

10 Claims, 22 Drawing Sheets

(52) U.S. Cl.
CPC ............... *F16D 2013/642* (2013.01); *F16D 2021/0615* (2013.01); *F16D 2021/0684* (2013.01); *Y02T 10/76* (2013.01)

(58) Field of Classification Search
CPC .. F16D 13/40; F16D 13/42; F16D 2021/0607; F16D 21/06; F16D 13/385
USPC ........................................................ 192/48.8
See application file for complete search history.

(56) References Cited

U.S. PATENT DOCUMENTS

| | | | | |
|---|---|---|---|---|
| 2003/0234149 A1* | 12/2003 | Peterseim et al. | ......... | 192/70.14 |
| 2008/0210513 A1* | 9/2008 | Dumas | .................... | F16D 13/64 |
| | | | | 192/107 C |
| 2011/0192693 A1* | 8/2011 | Bradley | ..................... | 192/48.92 |
| 2011/0297504 A1* | 12/2011 | Nedachi et al. | .......... | 192/109 A |
| 2013/0192950 A1* | 8/2013 | Warren | ................... | F16D 13/64 |
| | | | | 192/107 C |

FOREIGN PATENT DOCUMENTS

| | | | | |
|---|---|---|---|---|
| DE | 19611186 C1 | 10/1997 | | |
| DE | 19619683 C1 | 12/2008 | | |
| DE | 19881963 B4 | 11/2012 | | |
| EP | 0419329 | * | 3/1991 | ............ F16D 13/64 |
| WO | 2008058500 A2 | 5/2008 | | |

OTHER PUBLICATIONS

Definition of "Leaf," www.merriam-webster.com, snapshot taken Nov. 13, 2015.*

* cited by examiner

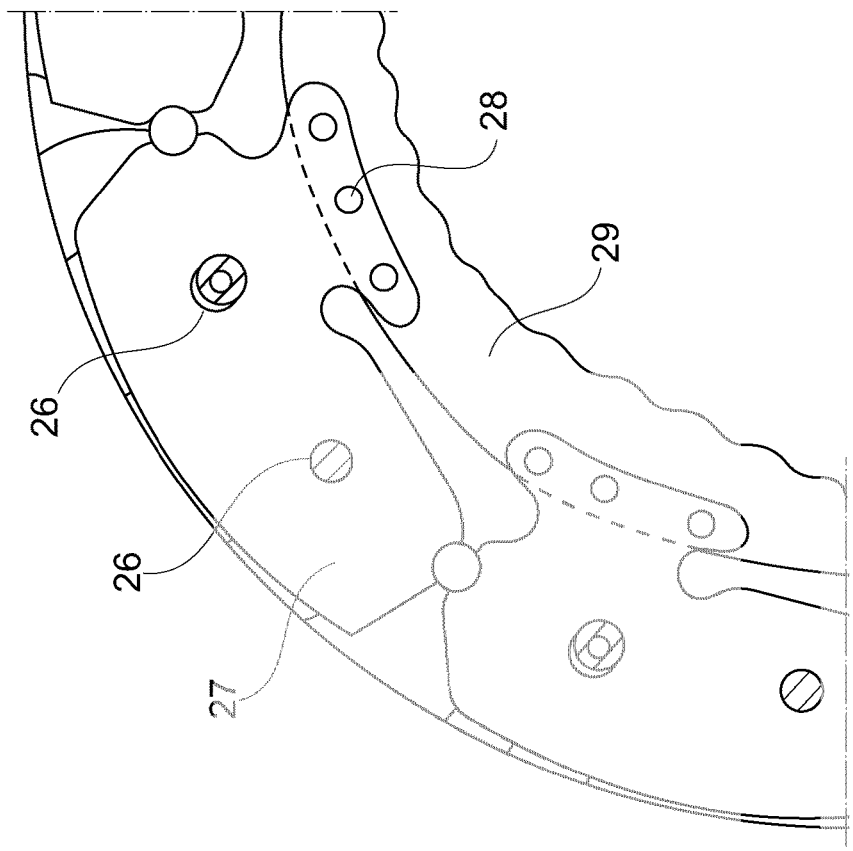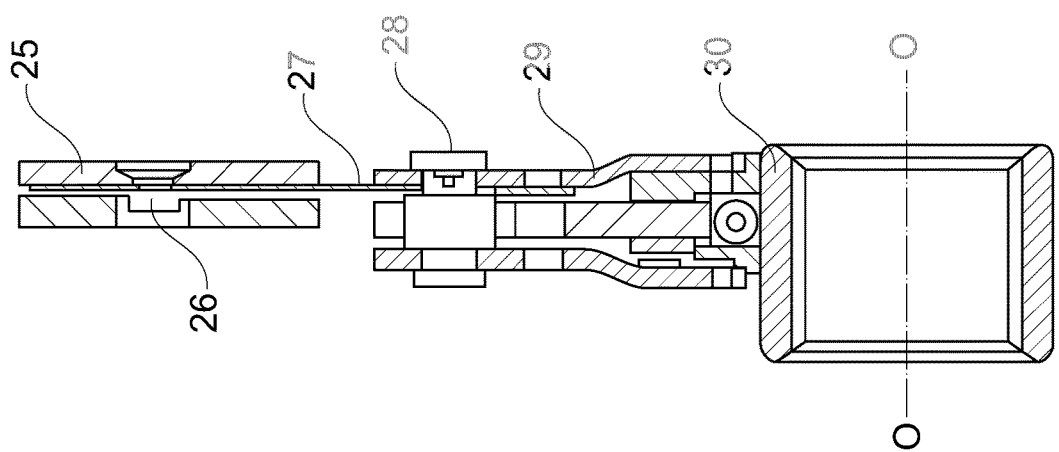
Fig. 5

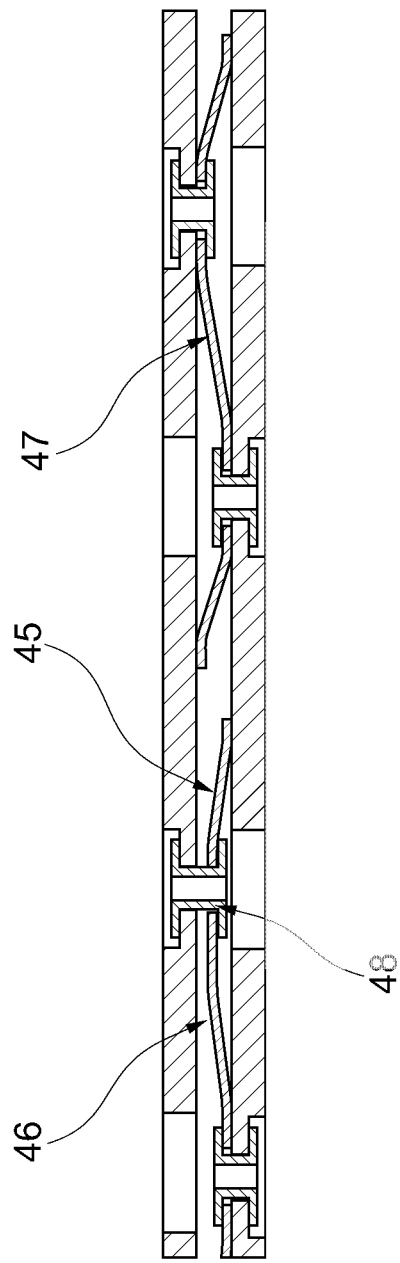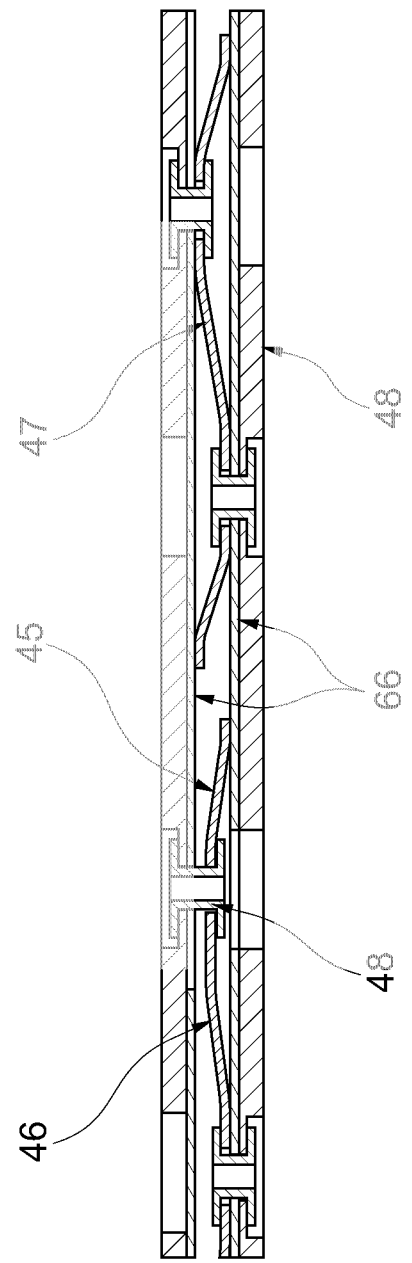

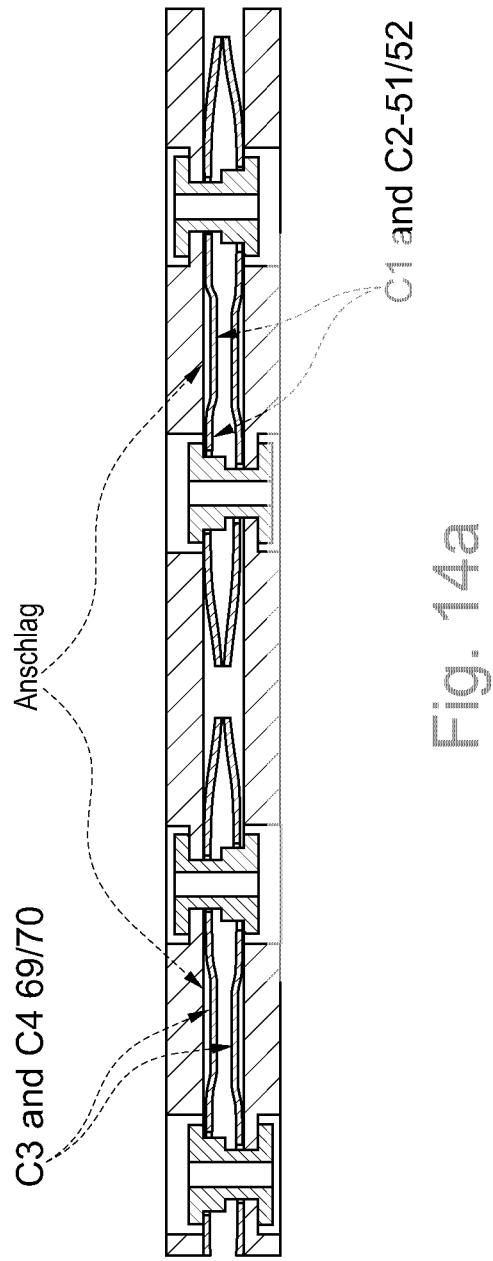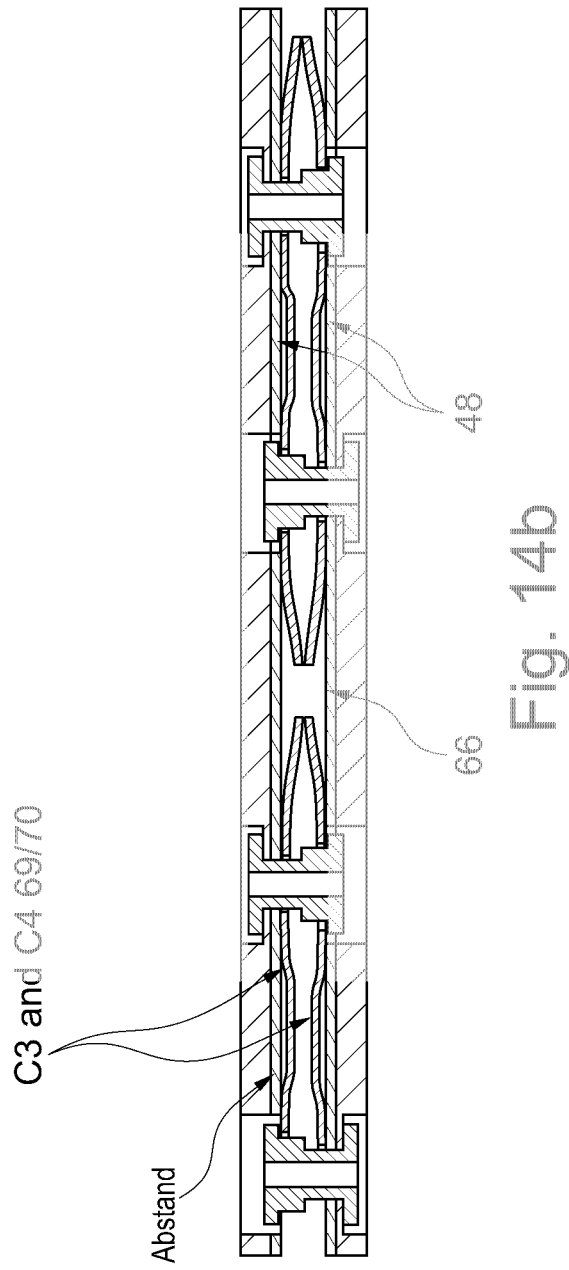

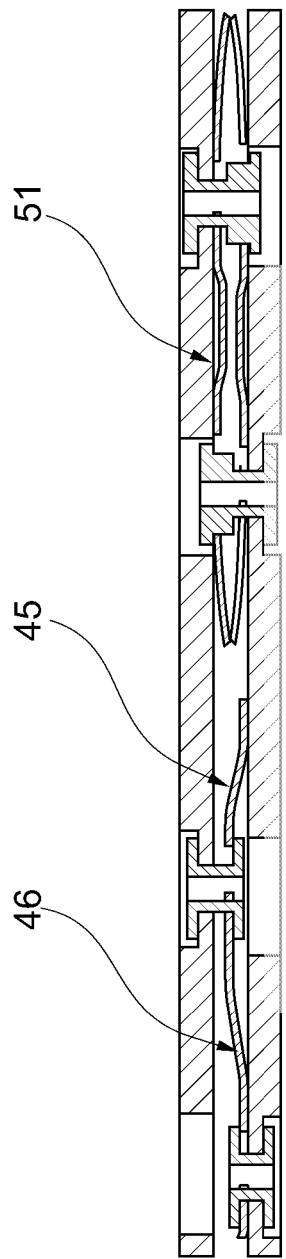
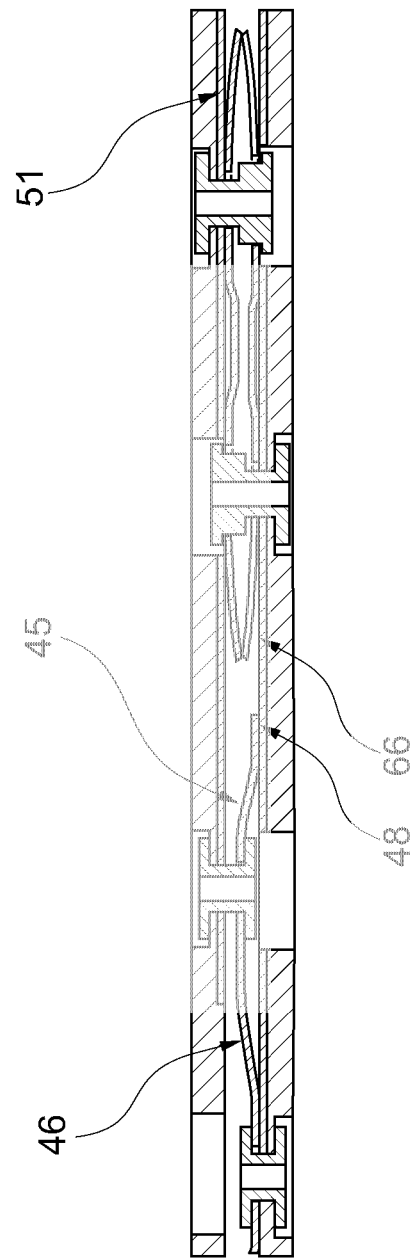
Fig. 15a
Fig. 15b

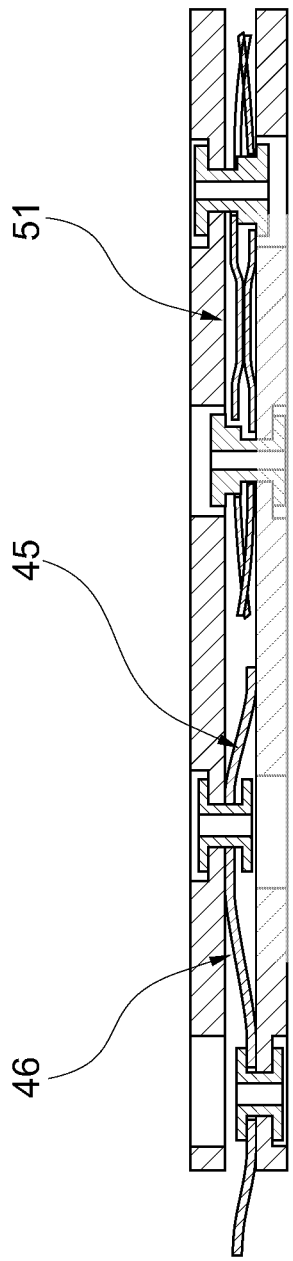
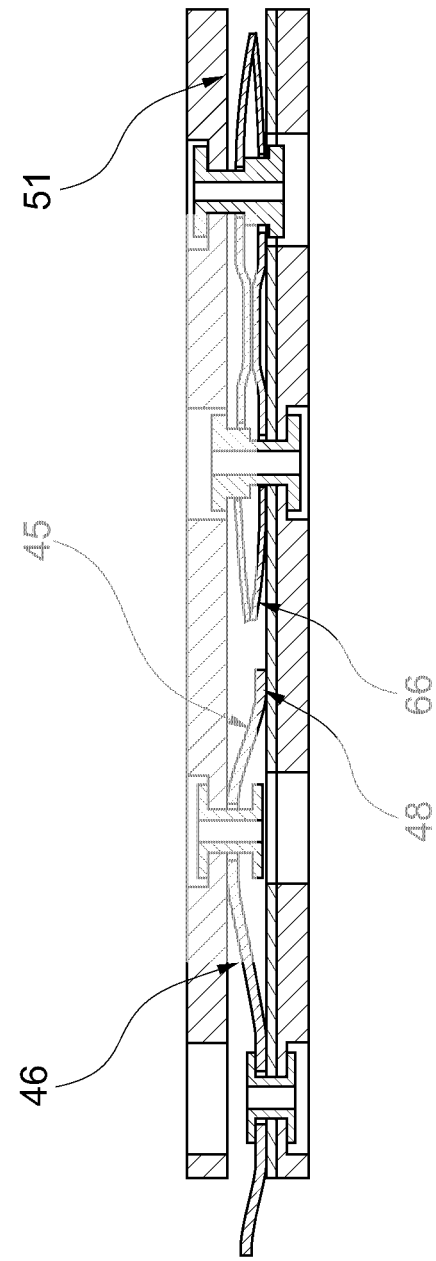

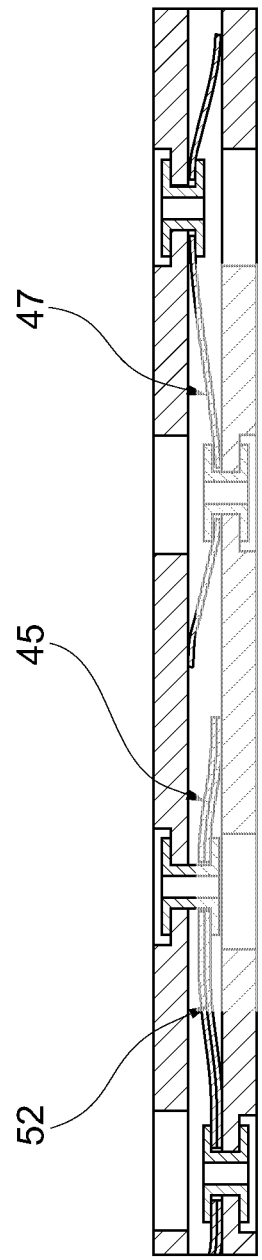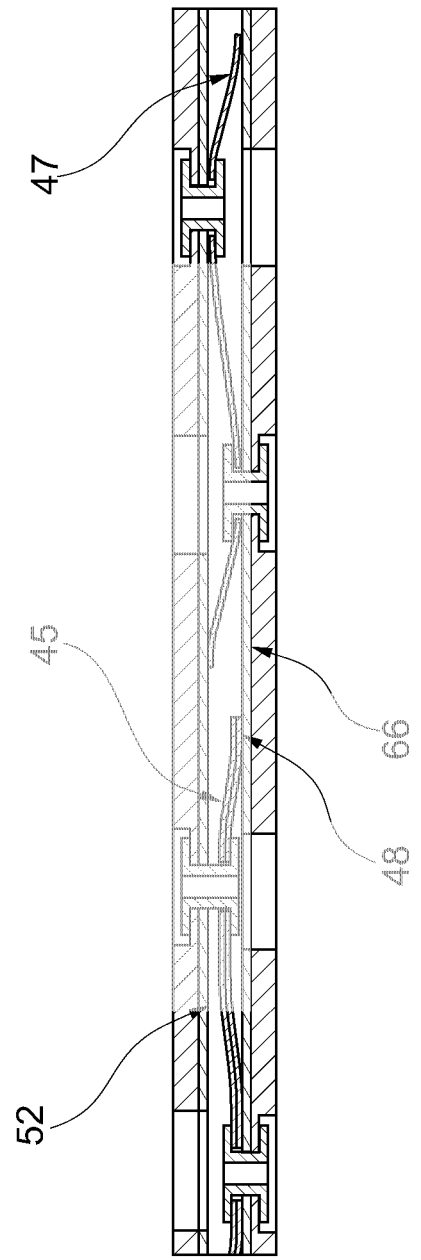

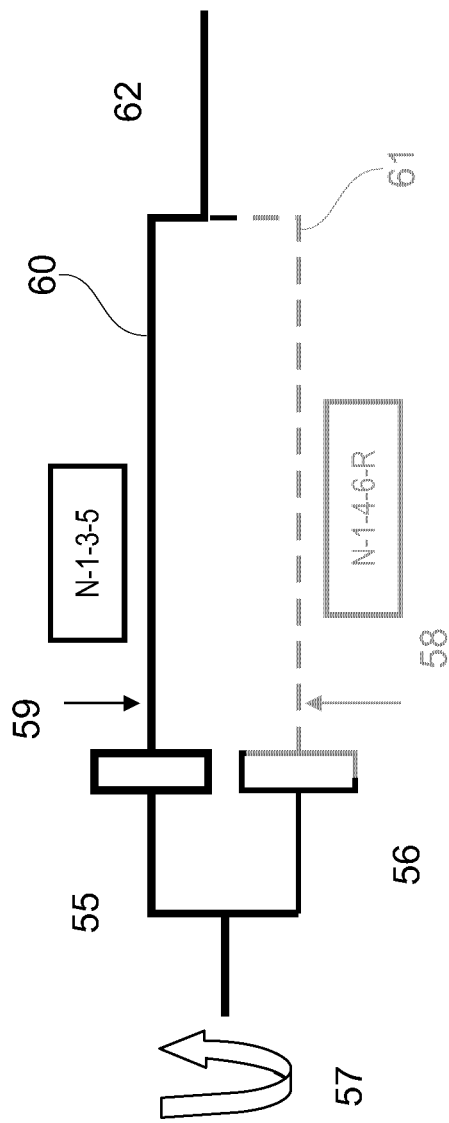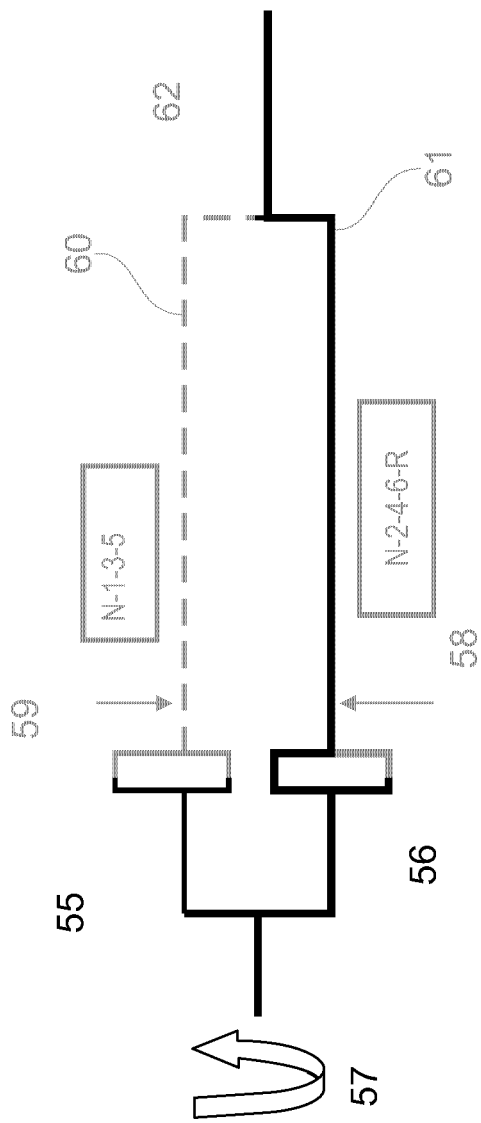

GEAR MECHANISM FOR MOTOR VEHICLES

BACKGROUND OF THE INVENTION

1. Field of the Invention

This invention relates generally to a gear mechanism for motor vehicles, in particular to a double clutch gear mechanism with two part gear mechanisms and a double clutch, which transmits torque from the engine optionally to one of the two part gear mechanisms.

2. Description of the Prior Art

Double clutch gear mechanisms, which are mainly concerned here, are automatic gear mechanisms which allow a fully automatic gear change without power interruption by means of two part gear mechanisms. The gear mechanism control selects the gears automatically or at the driver's request within the limits of the permitted speed ranges. Torque is transmitted via one of the two clutches which connect the two part gear mechanisms optionally with the engine. When one clutch closes, the other opens.

Such double clutches, in particular dry double clutches, often suffer from noise and vibration problems which mainly occur during creep processes, on start up from standstill, on load change procedures and during gear changes. The main problems here are gear rattle, start-up grab and selection impacts during the gear change.

U.S. Pat. No. 4,697,683 discloses a clutch in which the two friction disks consist of two support carrier disks arranged parallel to each other, between which a single-stage lining spring system is provided. The disadvantages described above also arise with these clutches.

SUMMARY OF THE INVENTION

A gear mechanism for motor vehicles includes a double clutch gear mechanism with two part gear mechanisms and a double clutch which transmits torque from the engine optionally to one of the two part gear mechanisms, with a central disk connected to a drive disk, two outer pressure application plates which are also connected to the drive disk and are moveable in the axial direction relative to the central disk, and friction disks arranged between the central disk and the pressure application plates, wherein the friction disks consist of two support carrier disks arranged parallel to each other and moveably in relation to each other, between which leaf-like spring segments are provided. To eliminate vibration problems which can occur on start-up from standstill, on load-change processes and during the gear change, the leaf-like spring segments have different spring characteristic curves with which a multistage spring characteristic is achieved.

The gear mechanism effectively prevents gear rattle, start-up grab and the occurrence of selection impacts due to leaf-like spring segments, arranged between the support carrier disks, having different characteristic curves so that a multistage spring characteristic can be achieved.

The lining spring system in conjunction with an electronic control, in particular double dry clutches display an entirely new harmonic behavior.

By means of the multistage spring characteristic, substantially three coupling regions are created: a first coupling region with a gear rattle damping, a second coupling region with a bite point control and creep control, and a third coupling region for the part- and full-load operations.

In a refinement of the system, by means of the multistage spring characteristic, five phases can even be optimized: a load point region in which no or very little moment is transmitted (0 to around 1 Nm), an anti-rattle region (around 1 to around 5 Nm), a creep region (around 5 to around 10 Nm), a part-load region (around 10 to around 25 Nm), and a full-load region (over 50 Nm).

The multistage spring characteristic can be achieved in various ways by corresponding selection of the spring segments.

For example the spring segments, which suitably consist of undulating steel plates, can be given different plate thicknesses and/or alternately different spring characteristics.

Alternatively the spring segments can be formed integrally and have a progressive characteristic curve.

A further variant provides that the spring segments are formed as double packets in series connection with different characteristic curves.

Furthermore it is possible to form the spring segments as double packets in parallel connection with different characteristic curves.

In addition the spring segments can be formed alternately as double packets and single springs.

Furthermore the spring segments can have different contact regions which come to rest successively on the respective counter-surface, wherein the spring segments of the one group retain a distance from the counter-surface in the decoupled state.

The spring segments are suitably established on the support carrier disks by means of rivets.

An advantageous embodiment comprises a carrier plate being arranged on at least one side between the respective support carrier disk and the spring segments.

The gear mechanism with the clutches described can be used both for automatic and for manual gear mechanisms with just one gear train. In particular the invention is suitable for double clutch gear mechanisms with two part gear mechanisms and a dry double clutch which transmits the torque from the engine optionally to one of the two part gear mechanisms. In this application the respective passive drive train is used for gear rattle damping.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 5 is a section through the upper region of a clutch disk, and to the right thereof, a front view thereof.

DESCRIPTION OF THE PREFERRED EMBODIMENT

Figure 1:
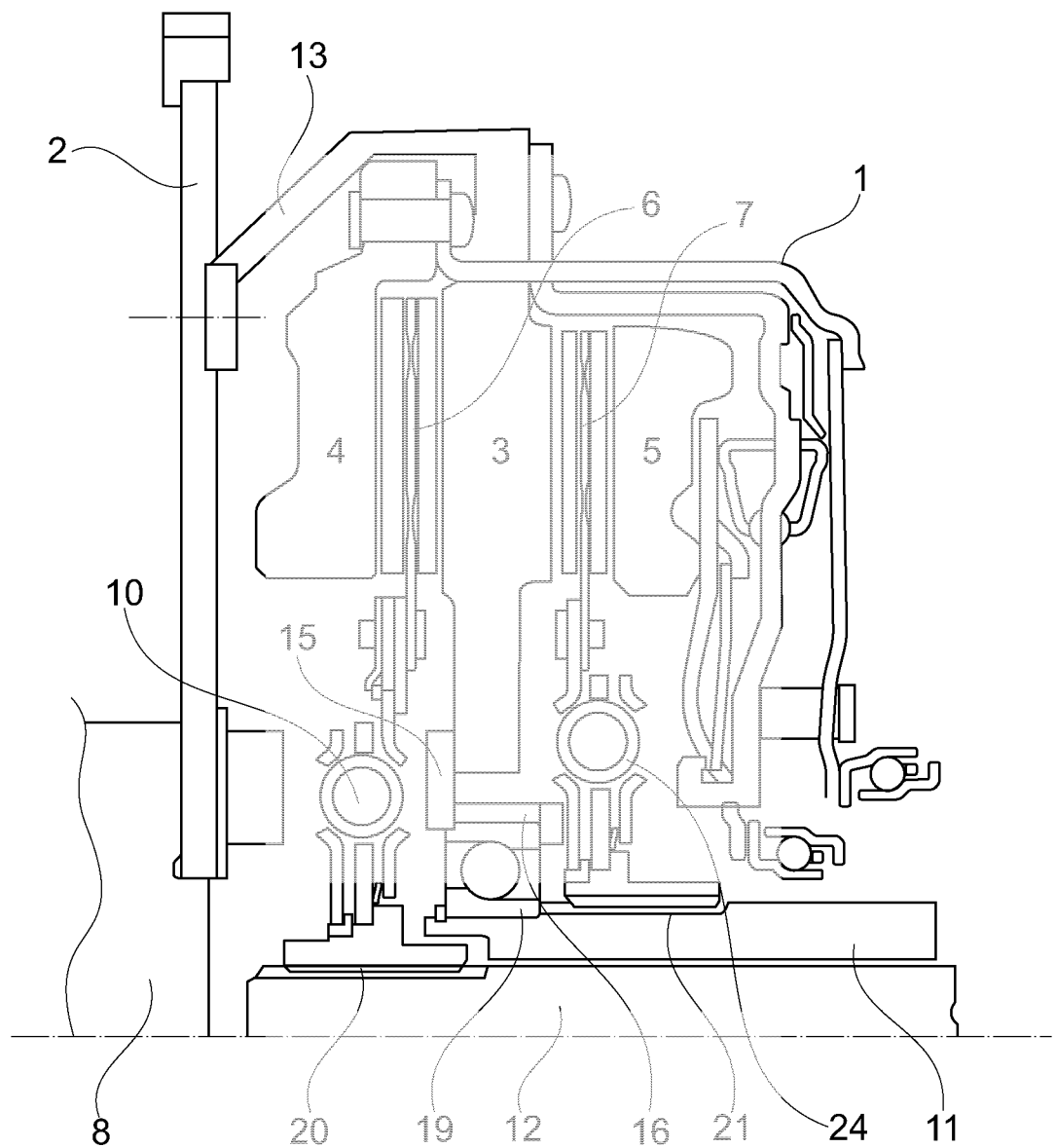
FIG. 1 is a section though the upper part of an exemplary embodiment of a double clutch.

According to FIG. 1 of the drawing, a double clutch 1 substantially consists of a drive disk 2, a central disk 3 connected thereto, pressure application plates 4 and 5 provided on both sides of the central disk 3, and friction disks 6 and 7 arranged between the central disk 3 and the pressure application plates 4 and 5 respectively.

The drive disk 2 sits rotationally fixed on an input shaft 8 of the double clutch 1 and consequently rotates therewith at the same rotation speed. The input shaft 8 is normally the driveshaft or crankshaft of an engine not shown in the drawing.

The drive disk 2 is connected to the central disk 3 via a clutch body 13, i.e. the central disk 3 rotates with the same rotation speed as the drive disk 2. The pressure application plates 4 and 5 arranged on both sides of the central disk 3 rotate with the central disk 3 but are however moveable axially in relation to the central disk 3. The central disk 3 is supported axially via a clutch bearing 19 and a cardanic thrust washer 16 and a cardanic coupling 15 on a hollow shaft 11 leading to the gear mechanism, and is radially free-running.

To trigger the coupling process, one of the pressure application plates 4 and 5 is moved in the direction of the central disk 3, whereby the respective friction disk 6 or 7 is pressed firmly against the central disk 3.

By the coupling of the respective friction disk 6 or 7, this rotates with the central disk 3 and transmits the engine torque to the respective output shaft 11 or 12 of the double clutch 1 leading to the gear mechanism.

The output shaft 12, which can be connected to the friction disk 6 shown on the left in the drawing, is formed as a solid shaft and, like the output shaft 11, opens into a gear mechanism housing not shown in the drawing, where it serves to drive a first part gear mechanism. This first part gear mechanism for example serves gears 1, 3 and 5.

The output shaft 11, which can be connected to the friction disk 7 shown on the right in the drawing, as a hollow shaft surrounds the solid shaft 12 and also leads into the gear mechanism housing not shown in the drawing. It serves to drive a second part gear mechanism, which for example is provided for gears 2, 4, 6 and R.

The output shafts 11 and 12 are each connected by form fit, via a notched toothing 20 or 21, to the friction disks 6 and 7 via damping systems 10 and 24.

The entire double clutch 1 shown in FIG. 1 is surrounded by a clutch housing, not shown in the drawing. The axial irregularities are compensated by a lining spring system within the clutch. The radial compensation is achieved by the radial play between the central disk 3 and the cardanic thrust washer 16 and the cardanic coupling 15.

Figure 2:
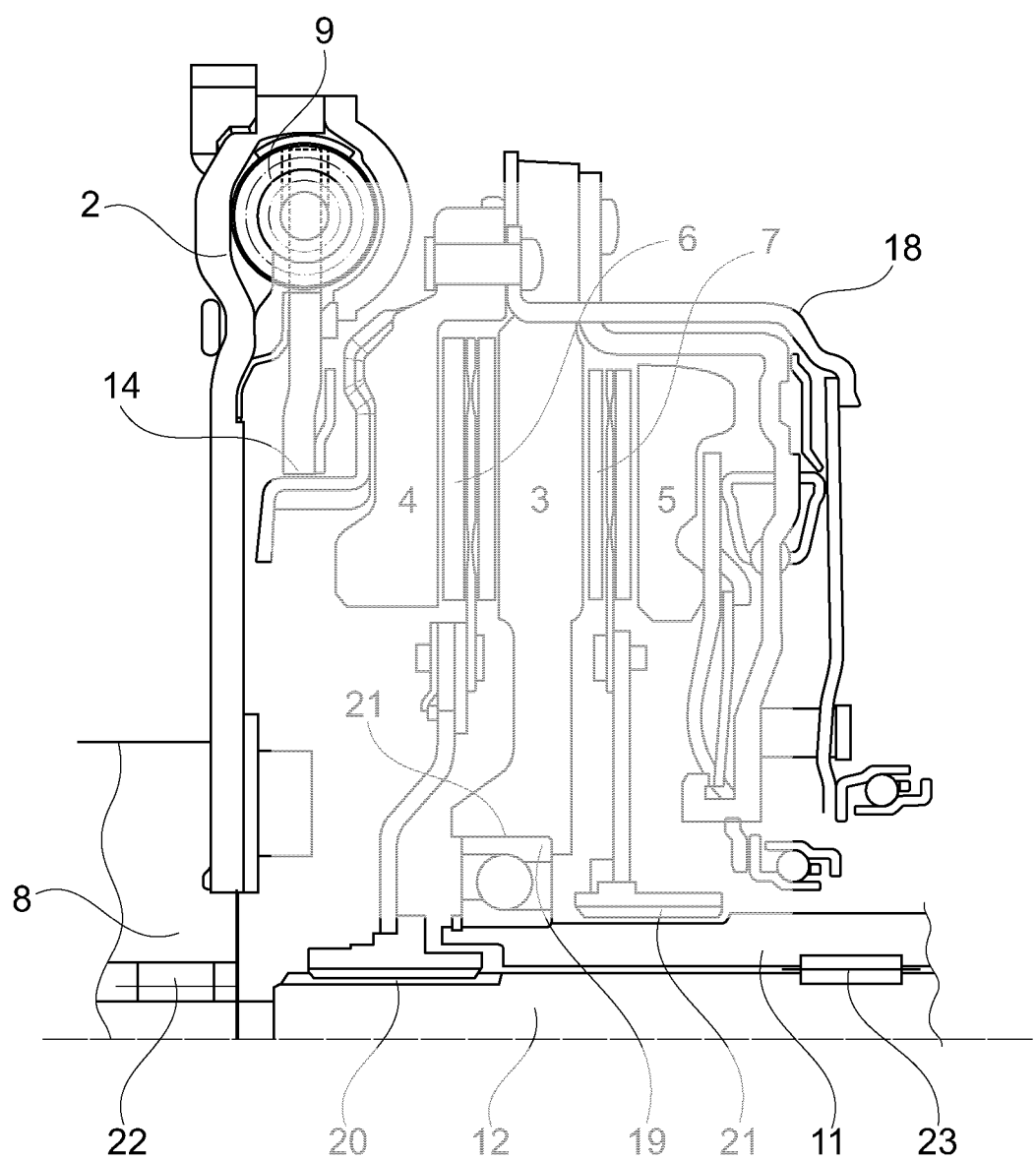
FIG. 2 is the same section through a second exemplary embodiment of a double clutch.

According to FIG. 2 of the drawing, the double clutch 18 substantially comprises the same basic elements as the double clutch 1 in FIG. 1, wherein for the individually correlating parts, the same position numerals have been used as in the exemplary embodiment in FIG. 1.

In the double clutch 18 shown in FIG. 2, the drive disk 2 is connected to the central disk 3 via a torsion damper 9 and a clutch body 14, i.e. the central disk 3 rotates at the same rotation speed as the drive disk 2. The pressure application plates 4 and 5 arranged on both sides of the central disk 3 rotate with the central disk but are however axially moveable in relation to the central disk 3. The central disk, in contrast to the first exemplary embodiment, is supported on the hollow shaft 11 via a bearing 19 and decoupled from the input shaft.

The respective friction disks 6 and 7 are coupled and decoupled in the same way as in the exemplary embodiment shown in FIG. 1.

In contrast to the embodiment shown in FIG. 1, a pilot bearing 22 is provided between the solid shaft 12 and the engine input shaft 8.

Figure 3:
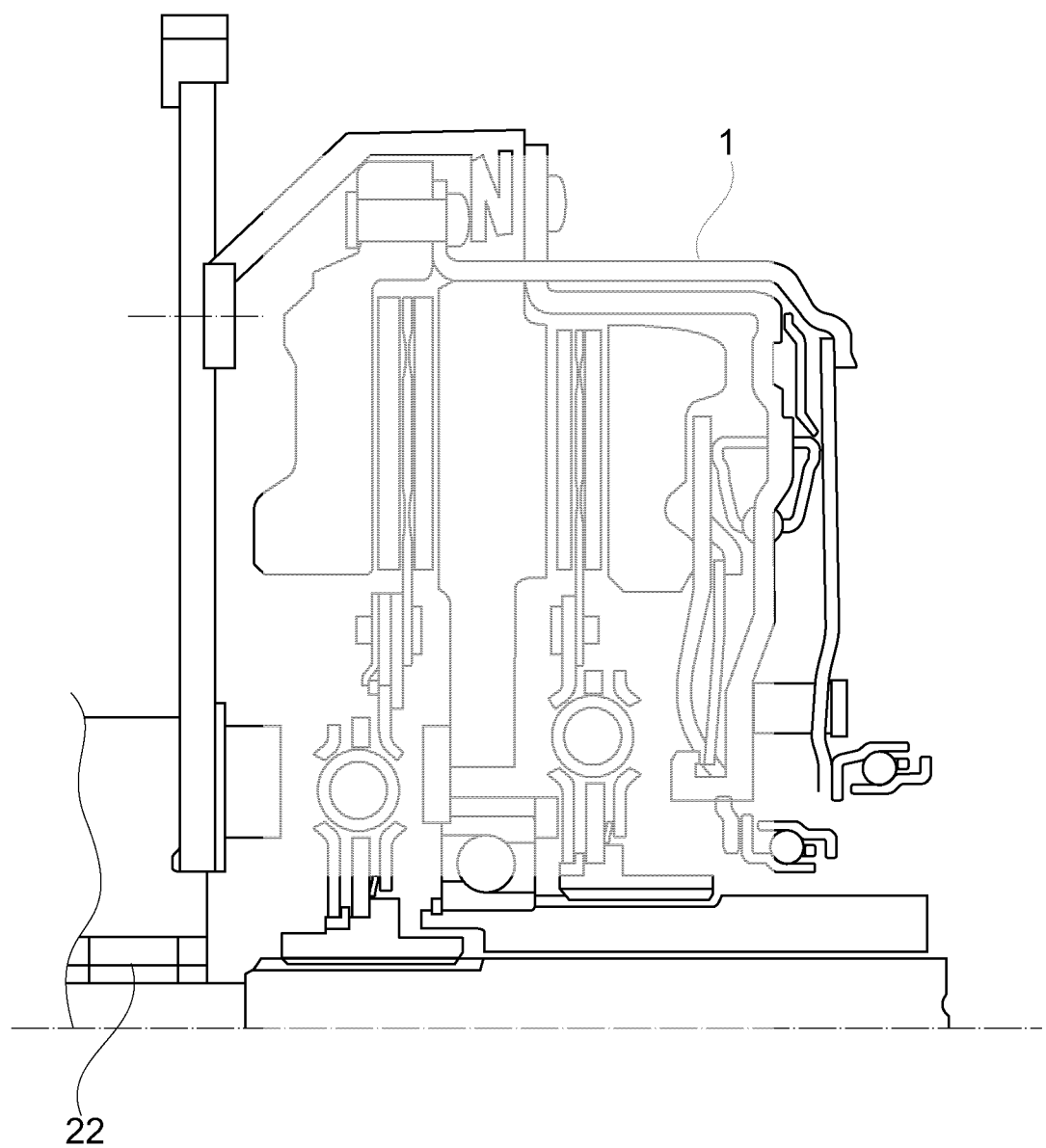
FIG. 3 is the same section through a third exemplary embodiment of a double clutch.

The exemplary embodiment shown in FIG. 3 is substantially identical to the clutch design in FIG. 1. However a pilot bearing 22 is positioned between the solid shaft 12 and the engine input shaft 8, as in the exemplary embodiment in FIG. 2.

Figure 4:
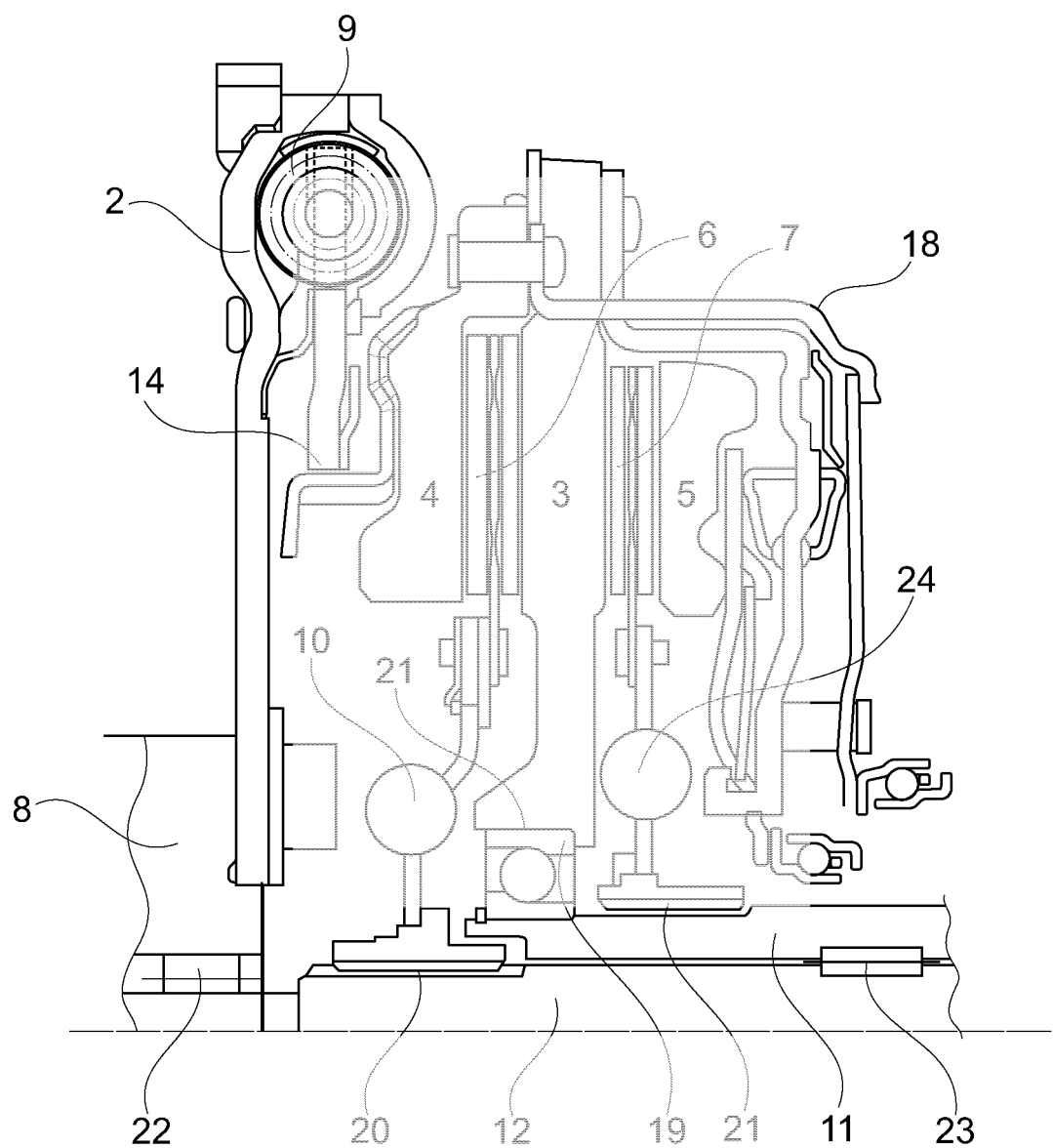
FIG. 4 is the same section through a fourth exemplary embodiment of a double clutch.

The embodiment shown in FIG. 4 corresponds substantially to the clutch variant in FIG. 2. This embodiment however has two damping systems 10 and 24 which are arranged between the friction disks 6 and 7 and the output shafts 11 and 12 leading to the gear mechanisms.

Figure 6:
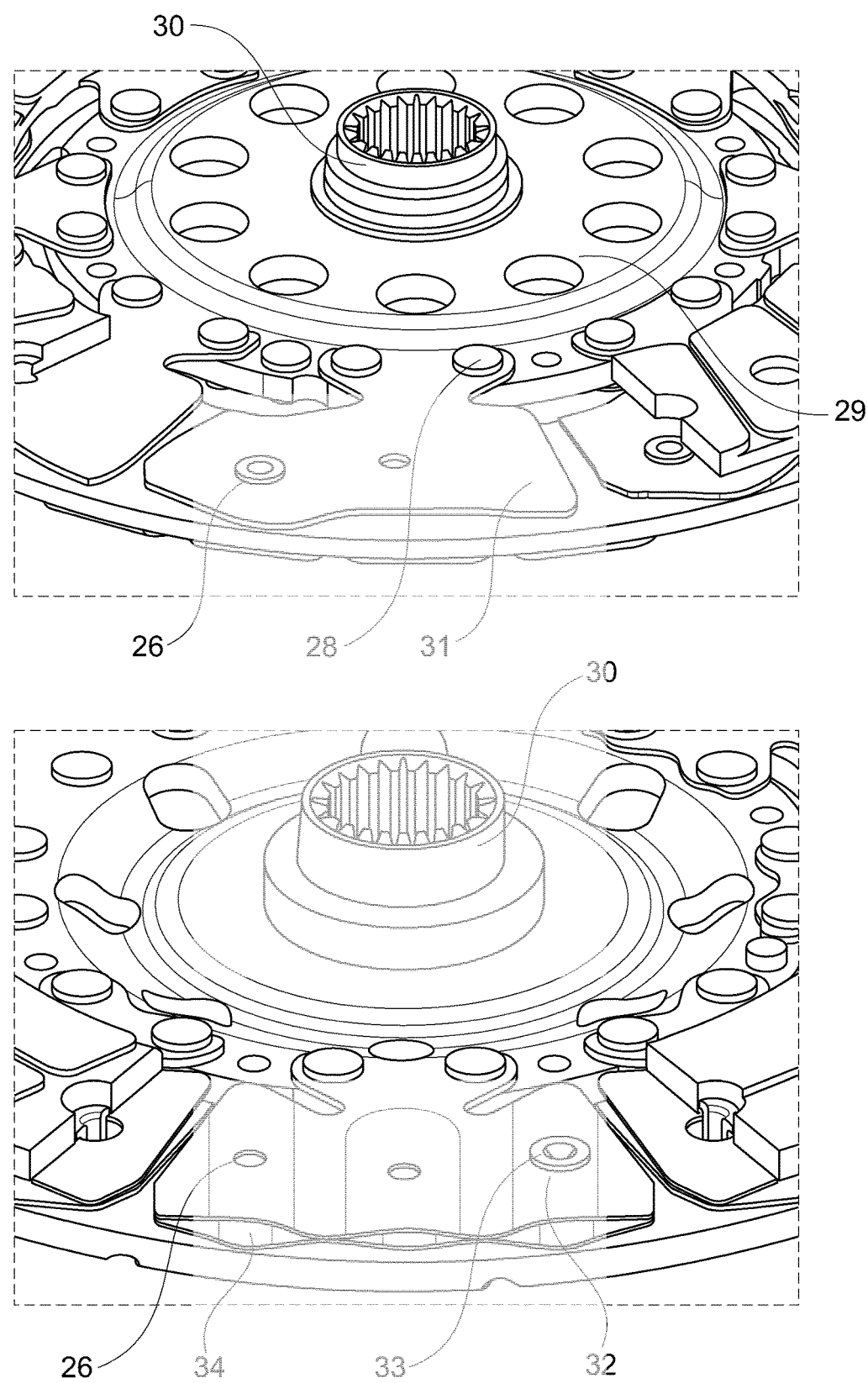
FIG. 6 shows the construction of the lining spring system of the clutch disk.

FIGS. 5 and 6 show standardized friction disk systems as used in the clutch friction disks in double clutch drives, automated gearboxes and manual gearboxes.

These friction disk systems are fitted with a clutch lining 25 and connected by means of lining rivets 26 to the spring segments 27, which in turn are connected via segment rivets 28 to the drive carrier disk 29. The drive carrier disk 29 has a hub 30 with an internal notched toothing which is formed integrally with the drive carrier disk 29 or can be connected thereto via a rivet connection.

FIG. 6 shows in perspective view two fundamental versions of spring segment systems. These comprise firstly a single segment 31 or a double spring segment 32, 34. In both systems, at least one spring segment is connected to the drive carrier disk 29 via a segment rivet 26. In the double spring segment system, the two single segments 32 and 34 can also be connected to the drive carrier disk.

Figure 7:
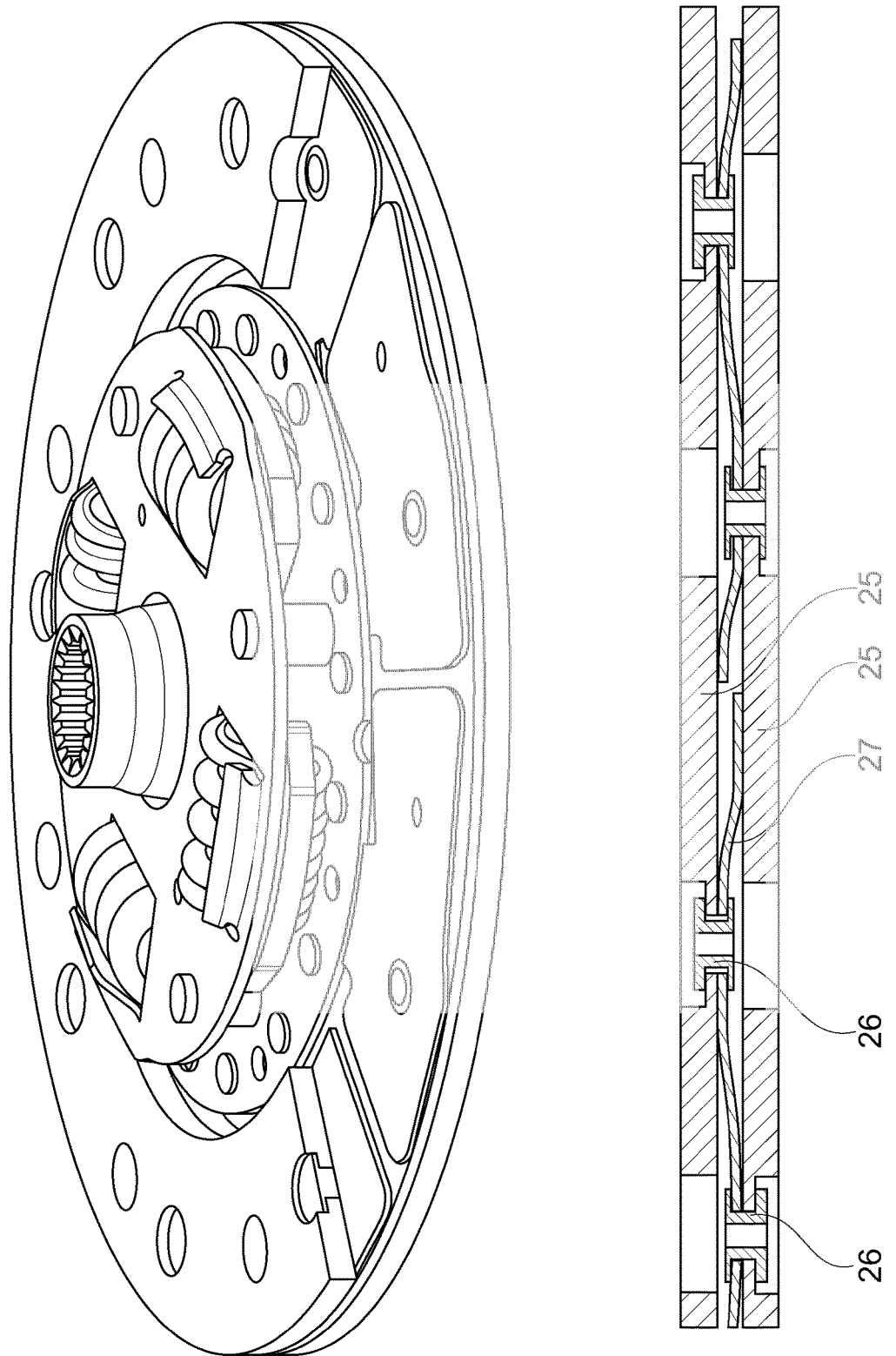
FIG. 7 shows a lining spring system with individual segments—one stage.
Figure 8:
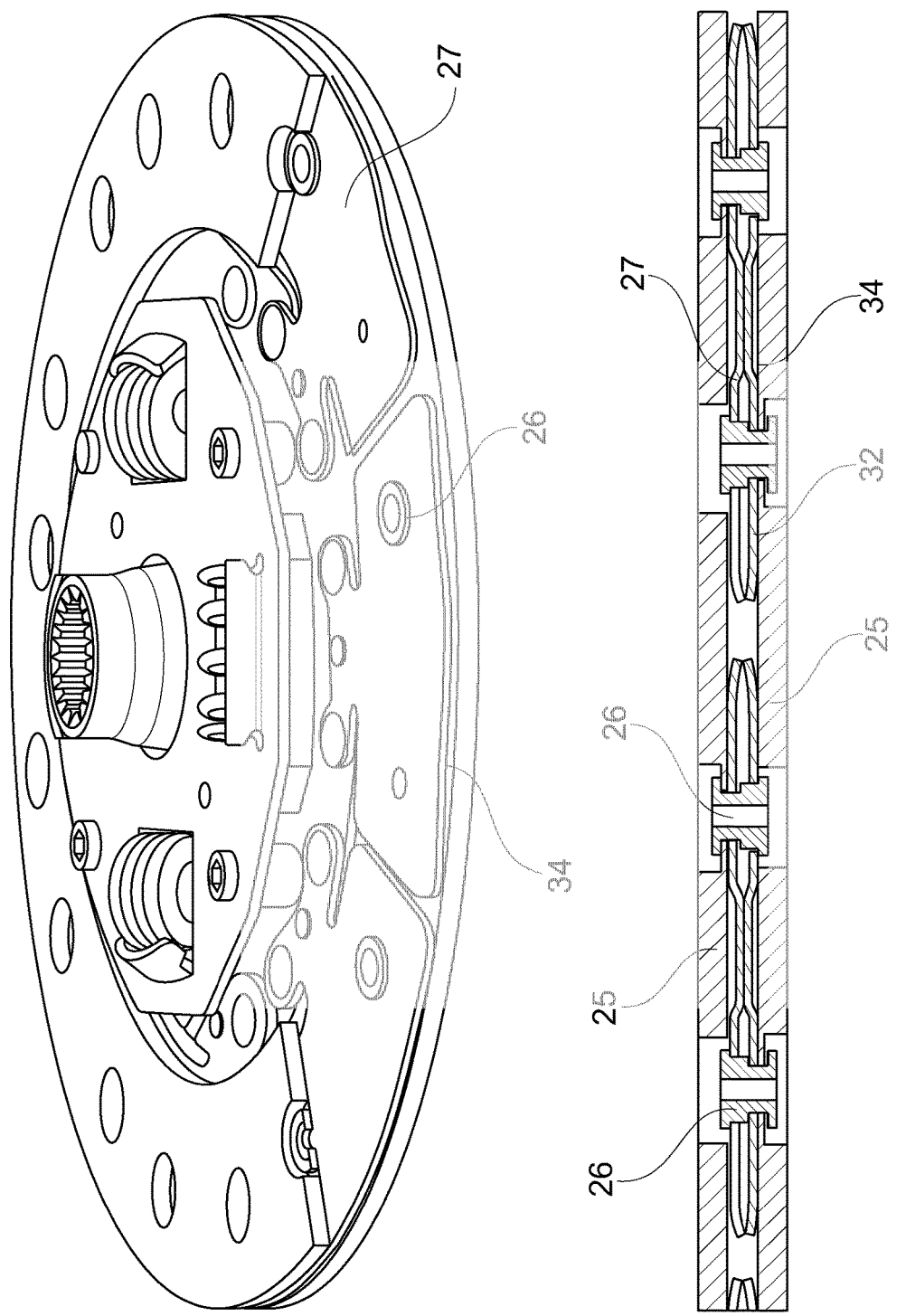
FIG. 8 shows a lining spring system with double segments—two stages.
Figure 9:
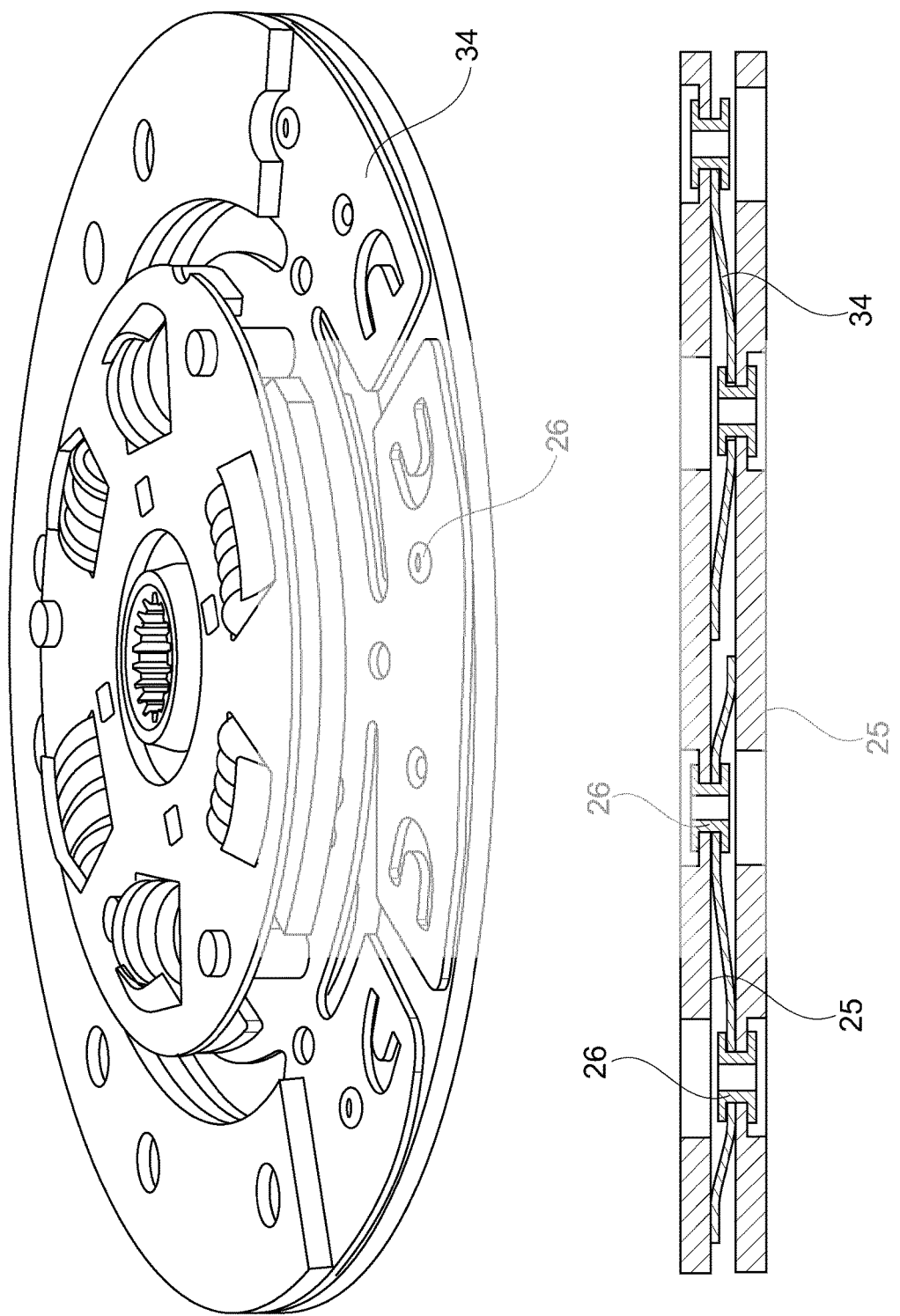
FIG. 9 shows a drive carrier disk with spring segments—one stage.
Figure 10:
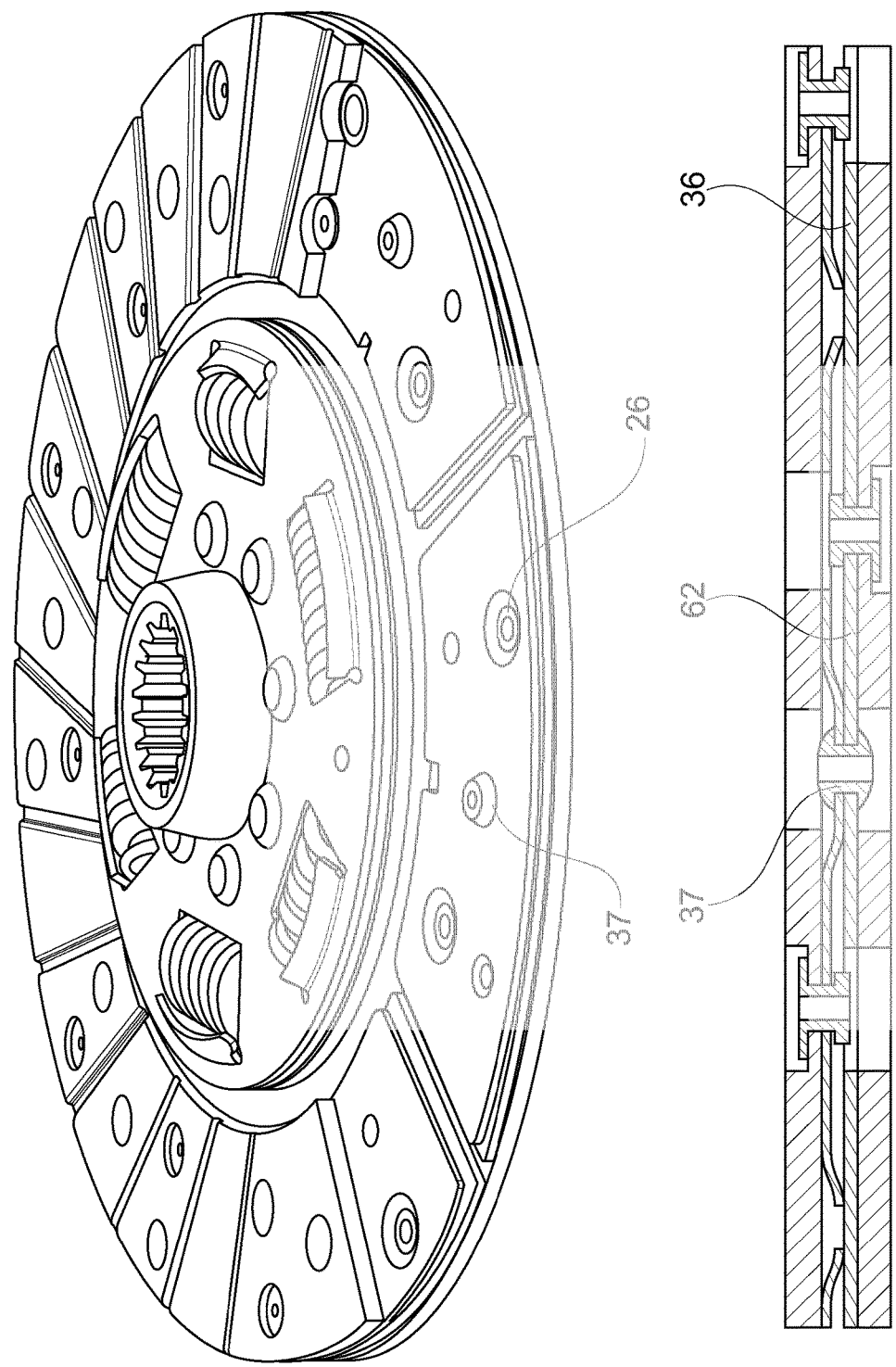
FIG. 10 shows an intermediate plate spring system—one stage.

Four different lining spring systems are known from the prior art:
1) One-stage lining characteristic, single or one-segment system:
    FIG. 7 shows a single or one-segment system. Here the two clutch linings 25 are riveted on either side to the thin, curved single segments 27 by means of lining rivets 26. The undulation of the single segments 27 or spring segments is here preferably oriented towards the side of the pressure application plates 4 and 5. In individual cases however the undulation can also be oriented towards the side of the central disk 3.
2) Two-stage lining characteristic, double segment springing system:
    FIG. 8 shows a double segment springing system. Two symmetrical double segments 32 arranged back to back, opposing in the active direction, are arranged between the clutch linings 25. The double spring segments 32 are clamped on opposite sides and connected alternately to the lining rivets 26 so as to allow full utilization of the existing spring travel. The advantage over single segmenting is a higher spring rate. Then only half or a smaller spring travel is required to build up the same coupling capacity. However in this embodiment, the clutch reinforcement is very great, which has a disadvantageous effect on the clutch controllability.
3) Single-stage lining characteristic, spring segment integrated in drive carrier disk:
    FIG. 9 shows the drive carrier disk with a single segment 34. This construction is designed for space reasons if rivet connection is not possible.
4) Single-stage lining characteristic, intermediate plate springing system
    FIG. 10 shows an intermediate plate springing system. Here the lining spring 36 is premounted on the drive carrier disk 29 and connected by force fit to the drive carrier disk via spring rivets 37. The clutch lining or linings in this embodiment are riveted directly to the carrier plate 62.

Figure 11:
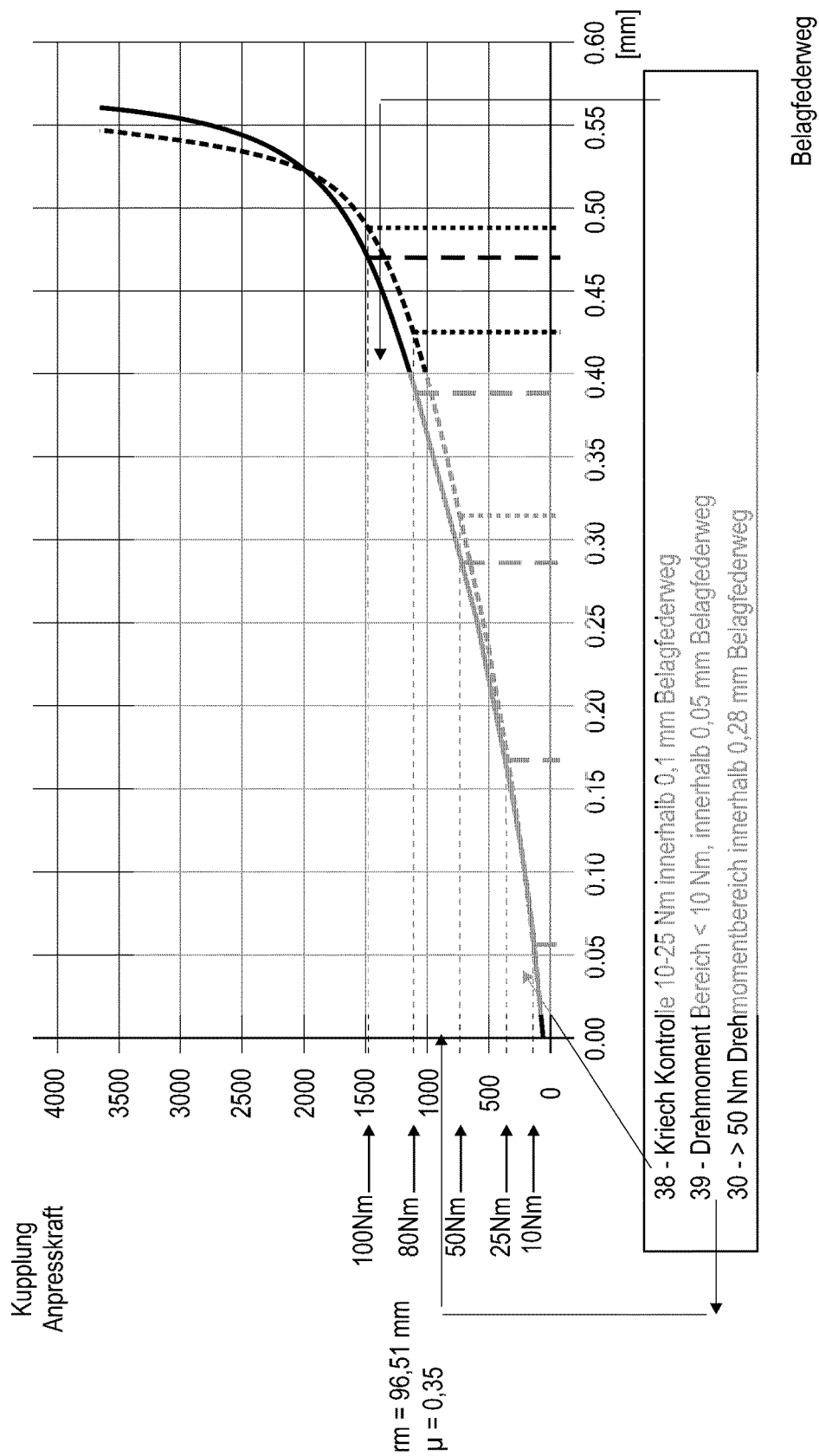
FIG. 11 shows a lining spring characteristic—one stage.

The coupling capacity is determined by the following formula:

$$Mk = Fa * Mu * Rm * z$$

where:
    Mk=coupling moment
    Fa=pressure application force
    Mu=coefficient of friction
    Rm=mean friction radius
    Z=number of friction surfaces The pressure application force arises from the resulting spring rates connected in series, multiplied by the spring travel when the clutch is pressed. In the medium and low torque regions, the clutch lining spring dominates the pressure application force characteristic. This is shown as an example in FIG. 11. Three regions are illustrated there:

1) Position 38
    Clutch creep moment from 10 Nm to 25 Nm, achieved over a spring travel of around 0.1 mm.
2) Position 39
    Bite point range in which no torque is transmitted, over a spring travel of around 0.05 mm.
3) Position 40
    Coupling point at which more than 50 Nm is transmitted over a spring travel of around 0.28 mm.

A lining spring characteristic curve shows as an example the very small spring travel band in which very high pressure application forces can be generated. If a high variability in the friction values is added, a high and also highly variable transmission function results with a high torque spread of the clutch.

This effect is shown in FIG. 12. The characteristic 44 here shows a possible transmission function with constant coefficient of friction, resulting from a small spring travel and a high spring rate of the lining springs used. To achieve a constant creep moment or bite point setting of the clutch reliably and repeatedly, a very precise travel control is required. This however causes difficulties if the coefficient of friction also varies.

To solve these problems, according to the invention a lining characteristic with at least two stages, up to four stages, is provided. This is depicted in FIGS. 12a to 12c, wherein this must be matched according to the level and variability of the lining coefficient of friction.

The following lining spring characteristics or stages are provided:
A) phase of gear rattle damping
B) clutch bite point and creep control
C) part-load range
D) full-load range With regard to the lining spring travel, the following feature combinations are proposed:
a) The lining spring travel is extended by around 0.5 mm compared with conventional lining spring travels. This is possible since modern friction linings are substantially more wear-resistant.
b) A gear rattle damping phase 63 is introduced in order to allow the introduction of an electronically controlled gear rattle prevention or damping system, namely for a region from 1 Nm to 5 Nm. The spring travel proposed here is 0.5 mm but this can also be varied.
c) A bite point and creep coupling moment phase 64 of 5 Nm to 25 Nm is proposed, within a lining spring travel of around 0.3 mm.
d) A part-load/start-up and operation phase 67 is introduced which is provided for operations over around 25 Nm to 50 Nm/120 Nm.
e) A full-load/start-up and operation phase 65 is introduced which is provided for coupling moments greater than around 120 Nm up to the end of the lining spring travel of the system at around 1.3 mm.

This entire characteristic cannot be achieved by a single lining spring characteristic curve but at least two or more spring characteristics are required. For this springs can be used in parallel connection or in series connection.

Figure 12A:
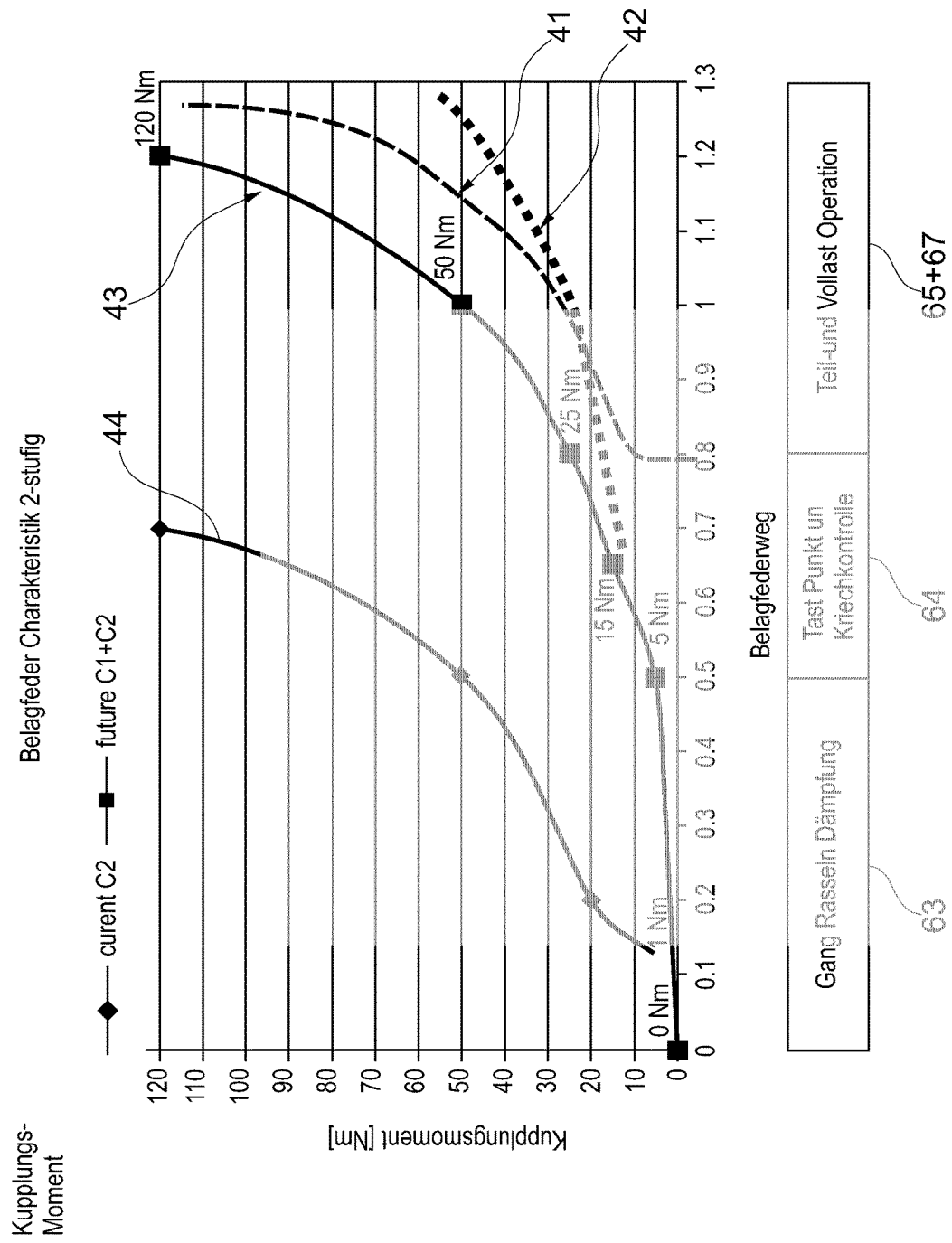
FIG. 12a shows a comparison of a lining spring characteristic compared with a two-stage characteristic (first stage linear, second stage progressive)
Figure 12B:
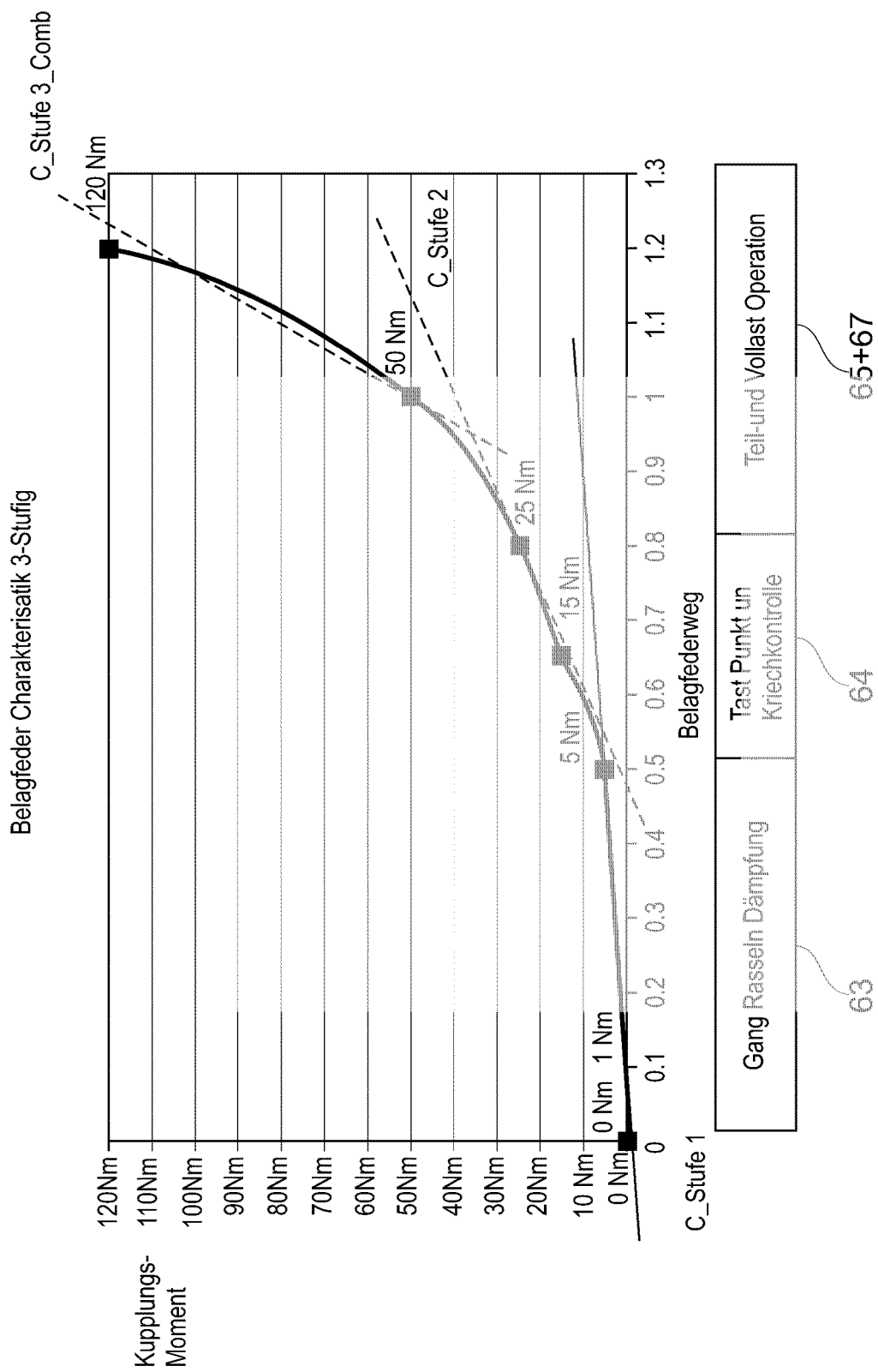
FIG. 12b shows a three-stage lining spring characteristic (first stage linear, second stage slightly progressive, third stage highly progressive)
Figure 12C:
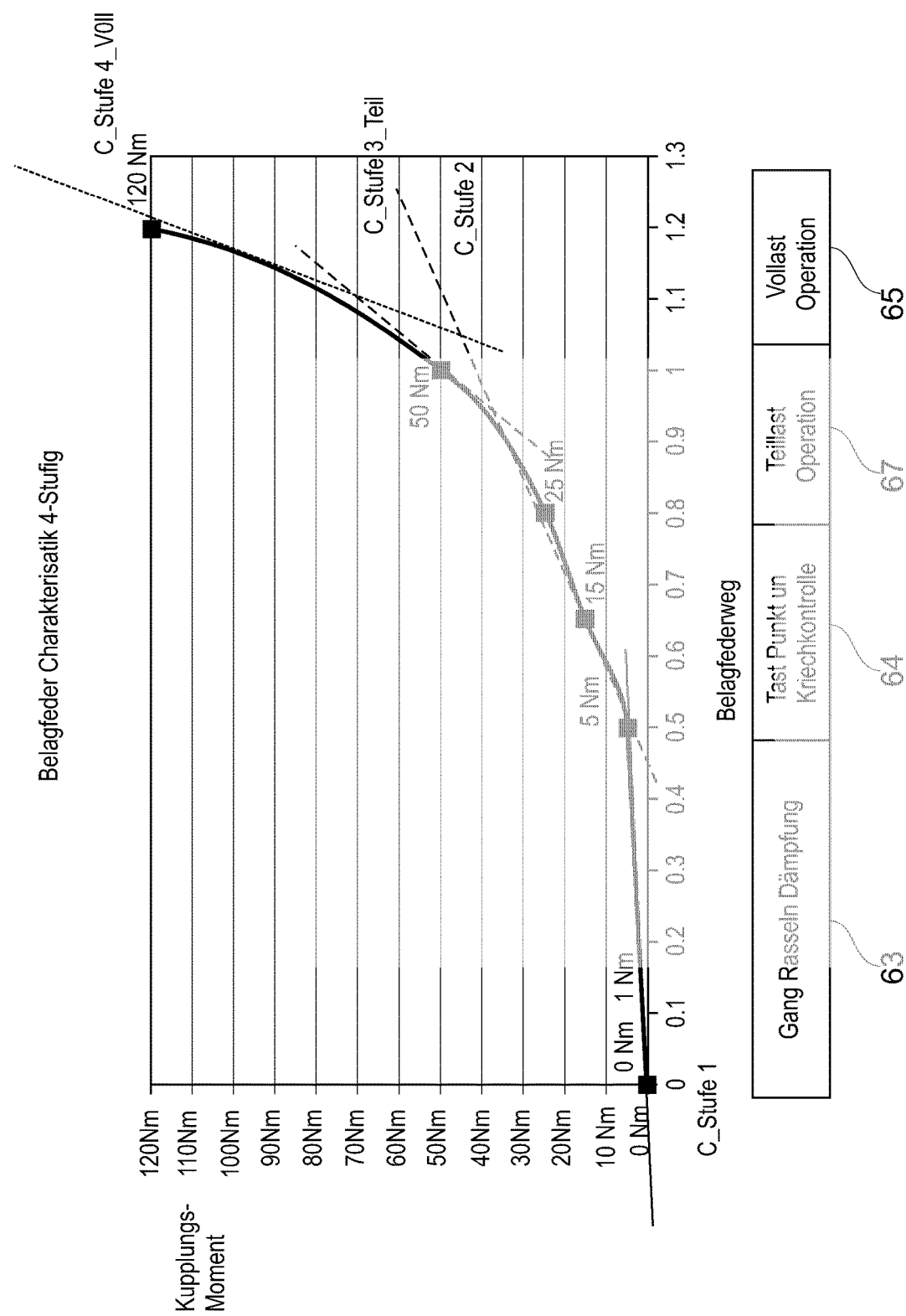
FIG. 12c shows a four-stage lining spring characteristic (first stage linear, second stage slightly progressive, third stage more progressive, fourth stage highly progressive), FIGS. 13a/b shows a first embodiment of a two-stage lining spring characteristic according to FIG. 12a, FIGS. 14a/b shows a first embodiment of a three-stage and four-stage lining spring characteristic according to FIGS. 12b and 12c, FIGS. 15a/b shows a second embodiment of an at least three-stage lining spring characteristic according to FIGS. 12a and 12b, FIGS. 15c/d shows a third embodiment of an at least two- or three-stage lining spring characteristic according to FIGS. 12a and 12b, FIGS. 16a/b shows a second embodiment of a two-stage lining spring characteristic with strong progression in the second stage according to FIG. 12a, FIG. 17a shows a third embodiment of a two-stage lining spring characteristic according to FIG. 12a, FIG. 17b shows a fourth embodiment of an at least three- to four-stage lining spring characteristic according to FIGS. 12b and 12c, and FIGS. 18a/b shows a double clutch diagram with active drive train and passive drive train.

FIG. 12a illustrates a solution with the resulting spring characteristic 43 which results from the superposition of a first spring characteristic 41 and a second spring characteristic 42, wherein the different lining spring travels are active, for example spring characteristic 42 from around 0.1 mm and spring characteristic 41 from around 0.8 mm. This solution arises from a two-stage spring characteristic, wherein the feature of this solution is that the first spring characteristic has a particularly flat characteristic curve and is used to damp the gear rattle on the passive drive path.

Preferably multistage solutions are used, as shown for example in FIGS. 12b and 12c. FIG. 12b shows a solution in three stages, wherein the third stage is provided for part-load and full-load operations. FIG. 12c shows an optimum spring characteristic curve which is divided into four regions:

C-Stage 1: Gear rattle damping
C-Stage 2: Clutch bite point and creep control
C-Stage 3: Part-load region
C-Stage 4: Full-load region Any individual total spring characteristic curve can be achieved in the same way with lining springs which are arranged in series or parallel connection. It is also possible to combine a series and parallel connection of the lining springs.

Different detailed solutions are described below which lead to a two- or multistage lining spring characteristic:

FIG. 13a shows a first single segment design in which a single segment 47 with a first spring rate is attached by force fit or connected via a rivet 49 to the clutch lining. A second single element 46 with a second spring rate is connected to the clutch lining only with one clutch rivet, wherein however the connection at the second lining rivet is designed such that a distance 45 remains from the clutch lining. When the two clutch linings are pressed together, first the spring rate of the lining spring 47 is applied and on further pressing together, the spring rate of the lining spring 46 is added so that both lining springs 47 and 46 are active. This can be achieved with a total of at least three segments, preferably 3 to 6 or 4 to 8 single segments, of which in each case the first half is fitted with the first spring rate and the second half with the second spring rate. The lining springs are then positioned such that a right-angled, parallel and stable position of the clutch linings is guaranteed. The individual segments are here integrated in or riveted by force fit to the drive carrier disk 28.

FIG. 13b shows a similar solution to FIG. 13a. The difference here lies only in that the clutch lining is glued to a carrier plate 66. In this case the carrier plate or the single segments can be connected to the drive carrier disk by force fit.

FIG. 14a shows a multistage, at least however two-stage, double segment variant in which a first double segment 51 with a specific first spring rate is attached to the clutch lining via rivets. A second double segment 52 with a second spring rate is also connected to the clutch lining by force fit.

In parallel to the first double segment variant, a second double segment variant is connected at a distance, in which the one element 69 has a third spring rate and the other segment 70 a fourth spring rate.

Both double segment variants are equipped with a stop, wherein the weaker spring characteristic curve is switched to mass in each case. When the two clutch linings are pressed together, both spring rates of lining springs 50 and 51 are then applied directly, and at a distance 45, then the lining springs 69 and 70.

Such a variant can be achieved with in total at least eight double segments, i.e. four with a distance and the first and second spring rates, and four without a distance with the third and fourth spring rates. Similarly, a 3/6 or 5/10 solution is possible.

The lining springs are then positioned to guarantee a right-angled, parallel and stable position of the clutch linings. The double segments are then either integrated in or riveted by force fit to the drive carrier disk 28.

FIG. 14b shows a similar design to FIG. 13a. The difference lies merely in that the clutch lining is glued to a carrier plate 66. In this case the carrier plate and the single segments can be connected to the drive carrier disk by force fit.

The spring characteristics are here as follows:
Stage 1: C-Stage 1=C1*C2/(C1+C2)
Stage 2: C-Stage 2=C1*C2/(C1+C2)+C3*C4/(C3+C4)
Stage 3: (Stop C1/C2):C-Stage 3=C2+C3*C4/(C3+C4)
Stage 4: (Stop C3/C4):C-Stage 4=C2+C4

FIG. 15a shows a second multistage segment variant in which a single segment 46 with a first spring rate is connected by force fit or riveted to the clutch lining. A second double segment 51 with a second spring rate is connected to both clutch linings. The single segment 46 is however attached by force fit to one clutch lining only with one lining rivet; on one of the two rivets, the connection is designed such that a distance 45 is present. When the two clutch linings are pressed together, first the spring rate of the double lining spring 51 is applied. When the rivet distance is then zero, both spring rates of the lining springs 51 and 46 are applied. This configuration can also achieve three spring rates in the same construction space, in that in the double segment, the two single segments have different spring rates. Thus at first, the first spring rate of the double segment 51 would act, then the spring rate of the single segment 45, and finally the combination of the spring rate of the single segment 46 with the two spring rates of the single segments of the double segment 51.

This arrangement can be achieved with a total of at least three single and double segments in a 3/6 or 4/8 configuration. The lining springs should then be positioned to guarantee a right-angled, parallel and stable position of the clutch linings. The single segments can either be integrated in or connected by force fit to the drive carrier disk 28.

FIG. 15b shows a similar solution to FIG. 15a. The difference however lies in that the clutch lining in the variant in FIG. 15b is glued to a carrier plate 66. In this case the carrier plate 66 or the single and double segments can be connected to the drive carrier disk by force fit via riveting.

The spring characteristics are here as follows:
Stage 1: C-Stage 1=C1*C2/(C1+C2)
Stage 2: C-Stage 2=C1*C2/(C1+C2)+C3
Stage 3 (Stop C1/C2): C-Stage 3=C2+C3

FIGS. 15c and 15d show a similar solution to FIGS. 15a and 15b. The difference here lies in the arrangement of the spring elements with the different spring characteristics:
Stage 1: C-Stage 1=C1
Stage 2: C-Stage 2=C3*C2/(C3+C2)+C1
Stage 3 (Stop C3/C2): C-Stage 3=C1+C3

FIG. 16a shows a lining variant in which one of the two lining spring systems is formed as a double-leaf lining spring 52. Alternatively here the lining springs shown as the single segment 47 can also be formed as double-leaf lining springs. In this design there is a possibility of achieving more than two spring rates in that different lining thicknesses or forms are used, and hence a very high spring rate progression is achieved.

FIG. 16b shows the same variant as FIG. 16a, wherein however the clutch lining 48 is fitted with a carrier plate 66.

Figure 17A:
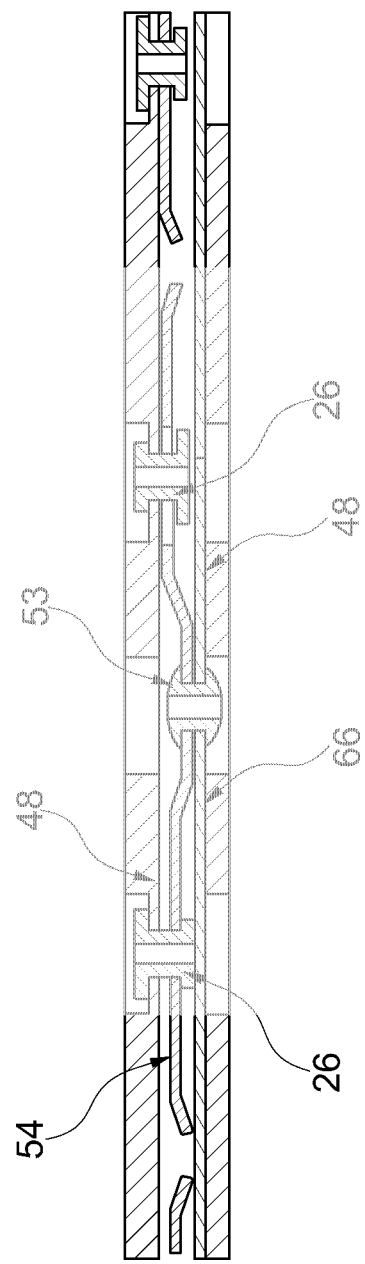

FIG. 17a shows a further two-stage lining variant with an intermediate plate solution and/or a double segment spring with two different spring rates which are implemented on an intermediate plate 54. This intermediate plate 54 is connected to the carrier plate 66 by force fit, for example by means of rivets 53, and furthermore to the clutch lining via lining rivets 26. One side of the intermediate plate 54 is in direct force-fit contact with the first clutch lining, while the other side of the intermediate plate 54 has a distance from the clutch lining. When the clutch is pressed together, first one side of the intermediate plate 54 with a first spring rate is compressed. When the distance between the intermediate plate 54 and the clutch lining 48 is zero, the second side comes into contact with the clutch lining so that the second combined spring rate is applied. In this embodiment the carrier plate or intermediate plate can be connected by force fit to the drive carrier disk.

Figure 17B:
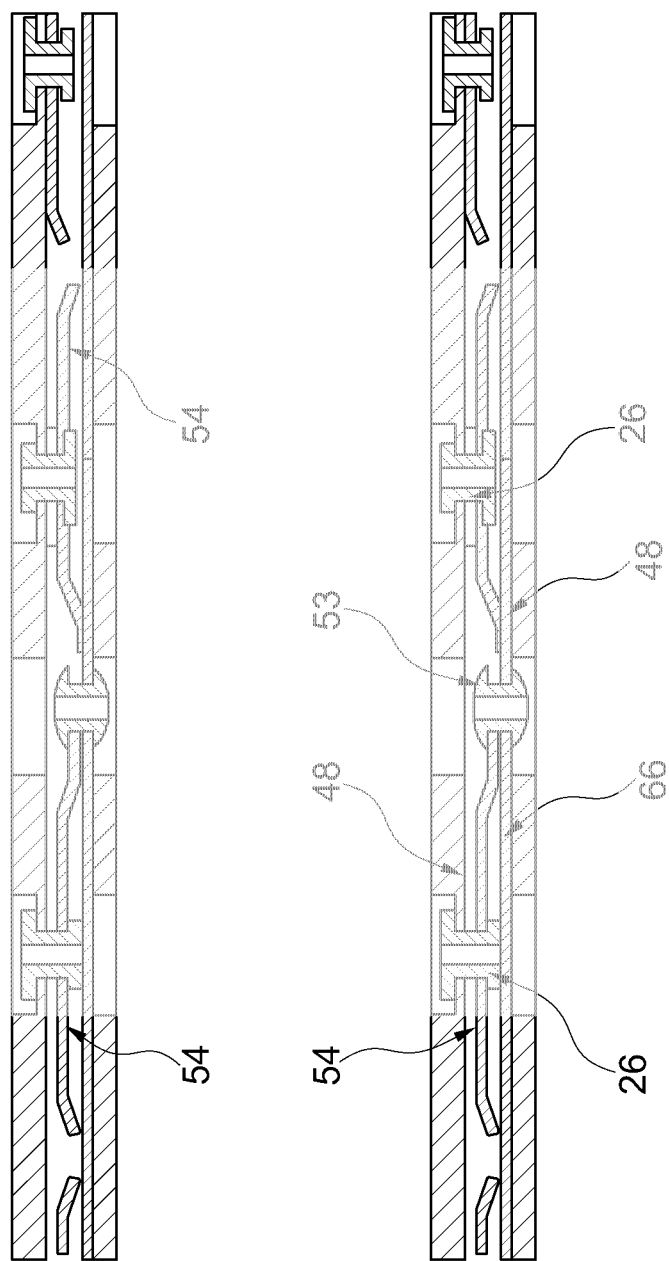

FIG. 17*b* shows a multistage lining design with an intermediate plate solution and/or a double segment spring 54 with two spring rates and a second double segment spring again with two different spring rates, which are implemented in a second intermediate plate. Here the distances between the lining variants can be selected such that optionally each of the four springs rates individually or together can be connected in parallel. This has the advantage that optionally a one- to four-stage version can be selected, wherein the one-stage version can be the total spring rate C1+C2+C3+C4 and the four-stage version C1, then C1+C2, then C1+C2+C3 and then C1+C2+C3+C4. All conceivable combinations connected in parallel are possible. The arrangement can be achieved with a total of at least three single and double segments, i.e. 3/6 or 4/8 configurations.

The lining springs are then positioned to guarantee a right-angled, parallel and stable position of the clutch linings. The single segments can either be integrated in or riveted by force fit to the drive carrier disk 28.

With reference to FIG. 18, a description is now given of how the invention can achieve the electronically controllable gear rattle prevention/damping:

FIG. 18*a* shows diagrammatically a double clutch system with a first part gear mechanism 59 together with a first clutch 55, and a second part gear mechanism 58 with a second clutch 56. The first part gear mechanism implements gears 1-3-5 and the second part gear mechanism gears 2-4-6. As shown in the drawing, in each case there is an active path 60 and a passive path 61. The passive path 61 can either be presynchronized or switched neutrally via the synchronization mechanism. In the exemplary embodiment shown in FIG. 18*a*, the second clutch 56 is switched passively.

Scenario 1: The passive path is pre synchronized.

In this case the clutch builds up a counter-moment and "clamps" the presynchronized gear wheels against each other, so they can no longer cause gear rattle. The other loose gear wheels are then given a corresponding differential rotation speed via the engaged second clutch 56, which in turn generates a damping on the non-presynchronized gear wheel and thus damps the gear rattle.

Scenario 2: The passive path is not presynchronized.

In this case application of the passive clutch generates a rotation speed difference between the loose gear wheels and the passive input shaft, which leads to a damping of gear rattle.

FIG. 18*b* shows the same double clutch gear mechanism as in FIG. 18*a*. Here however the first part gear mechanism 59 lies in the passive path 60 and the second part gear mechanism 58 in the active path 61. The scenarios 1 and 2 mentioned above can be transferred in similar manner to the first passive part gear mechanism.

The use of the passive part gear mechanism as damper for the loose gear wheels described above is in principle also applicable to double dry gear mechanisms and double wet gear mechanisms. The basic requirement for such an application is that the passive path is always held under slip control and hence the passive path is shielded from engine torque irregularities. This is possible only if the coupling moment can be set precisely in the region from around 1 Nm to 10 Nm. The invention described here of the two- or multistage lining spring as a solution for gear rattle damping is indispensable.

LIST OF REFERENCE NUMERALS

1 Double clutch/system 1
2 Drive disk
3 Central disk
4 Pressure application plate
5 Pressure application plate
6 Friction disk
7 Friction disk
8 Input shaft
9 Torsion damper
10 Torsion damper
11 Output shaft (hollow shaft)
12 Output shaft (solid shaft)
13 Clutch body 1
14 Clutch body 2
15 Cardanic coupling of central disk
16 Cardanic thrust washer
17 Central disk mounted on hollow shaft 11
18 Double clutch/system 2
19 Clutch bearing
20 Notched toothing—clutch 1
21 Notched toothing—clutch 2
22 Pilot bearing
23 Bearing system/hollow shaft/solid shaft
24 Torsion damper
25 Clutch lining
26 Lining rivet
27 Spring segment 1
28 Segment rivet, drive carrier disk
29 Drive carrier disk
30 Hub
31 Single segment
32 Double segment
33 Segment lining rivet
34 Spring segment 2
35 Single disk spring segment
36 Premounted lining spring/drive carrier disk system
37 Spring rivet
38 Phase—creep control
39 Phase—low torque transmission
40 Phase—high torque transmission
41 Single lining spring characteristic 1
42 Single lining spring characteristic 2
43 Lining spring characteristic 1+2 overlaid
44 Standard lining spring characteristic
45 Distance of lining spring 1 from lining spring 2
46 Lining spring 1
47 Lining spring 2
48 Clutch lining integrated in a steel disk
49 Lining rivet 2
50 Double lining spring characteristic 1
51 Double lining spring characteristic 2
52 Double leaf lining spring
53 Segment rivet
54 Double segment spring with two spring characteristics
55 Clutch 1
56 Clutch 2
57 Engine rotation speed
58 Part gear mechanism 1
59 Part gear mechanism 2

60 Active drive train
61 Passive drive train
62 Output shaft rotation speed
63 Gear rattle damping phase
64 Creep coupling moment phase
65 Start-up moment phase
66 Carrier plate
67 Part-load phase
68 Second double segment design
69 Double segment spring characteristic 3
70 Double segment spring characteristic 4

In accordance with the provisions of the patent statutes, the preferred embodiment has been described. However, it should be noted that the alternate embodiments can be practiced otherwise than as specifically illustrated and described.

The invention claimed is:

1. A gear mechanism for motor vehicles, comprising:
a double clutch gear mechanism including two part gear mechanisms and a double clutch, which transmits torque from an engine alternately to each of the two part gear mechanisms;
a central disk connected to a drive disk;
outer pressure application plates connected to the drive disk and moveable axially relative to the central disk;
friction disks arranged between the central disk and the pressure application plates, wherein each of the friction disks includes two support carrier disks arranged parallel to each other and moveably in relation to each other, between which non-planar spring segments are located, wherein the spring segments have different spring characteristics for producing a multistage spring characteristic via plate bending of the spring segments.

2. The gear mechanism as claimed in claim 1, wherein the spring segments include a plurality of undulating steel plates, each plate having a different plate thickness and a different spring characteristic.

3. The gear mechanism as claimed in claim 1, wherein the spring segments combined have a progressive characteristic curve.

4. The gear mechanism as claimed in claim 1, wherein the spring segments are formed as pairs of conjoined springs connected in series and having different characteristic curves.

5. The gear mechanism as claimed in claim 4, wherein the spring segments are formed alternately as the pairs of conjoined springs and single springs.

6. The gear mechanism as claimed in claim 1, wherein the spring segments are formed as pairs of conjoined springs connected in parallel and having different characteristic curves.

7. The gear mechanism as claimed in claim 1, wherein the spring segments are secured to the support carrier disks by rivets.

8. The gear mechanism as claimed in claim 1, wherein a carrier plate is arranged between one of the support carrier disks and one of the spring segments.

9. The gear mechanism as claimed in claim 1, further comprising, one active drive train and one passive drive train according to a respective gear that is engaged, wherein the passive drive train is provided with gear rattle damping.

10. A gear mechanism for motor vehicles, comprising:
a double clutch gear mechanism including two part gear mechanisms and a double clutch, which transmits torque from an engine alternately to each of the two part gear mechanisms;
a central disk connected to a drive disk;
outer pressure application plates connected to the drive disk and moveable axially relative to the central disk;
friction disks arranged between the central disk and the pressure application plates, wherein each of the friction disks includes two support carrier disks arranged parallel to each other and moveably in relation to each other, between which bent plate spring segments are located, wherein the spring segments have different spring characteristics for producing a multistage spring characteristic via plate bending of the spring segments, wherein the spring segments are secured to the support carrier disks by rivets.

* * * * *